(12) United States Patent
Owen et al.

(10) Patent No.: US 9,115,995 B1
(45) Date of Patent: Aug. 25, 2015

(54) ENHANCED GRAPHICAL FLIGHT PLANNING FOR A FLIGHT MANAGEMENT SYSTEM

(75) Inventors: Gary L. Owen, Robins, IA (US); Maureen A. Lehman, Cedar Rapids, IA (US); Michael G. Espenes, Robins, IA (US); Michael K. Bauer, Pooler, GA (US); Keith E. Kankelfitz, Atkins, IA (US); Richard S. Solar, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 2185 days.

(21) Appl. No.: 11/529,155

(22) Filed: Sep. 28, 2006

(51) Int. Cl.
*G05D 1/00* (2006.01)
*G01C 23/00* (2006.01)

(52) U.S. Cl.
CPC .............. *G01C 23/00* (2013.01); *G01C 23/005* (2013.01)

(58) Field of Classification Search
CPC .............................. G01C 23/00; G01C 23/005
USPC .............. 701/14, 16, 206–211; 340/973–975
See application file for complete search history.

(56) References Cited

U.S. PATENT DOCUMENTS

| | | | | |
|---|---|---|---|---|
| 4,621,335 | A * | 11/1986 | Bluish et al. | 340/945 |
| 6,282,466 | B1 * | 8/2001 | Nolte et al. | 701/11 |
| 6,349,258 | B1 * | 2/2002 | Bonhoure et al. | 701/206 |
| 6,633,810 | B1 * | 10/2003 | Qureshi et al. | 701/206 |
| 6,856,864 | B1 * | 2/2005 | Gibbs et al. | 701/3 |
| 7,191,406 | B1 * | 3/2007 | Barber et al. | 715/771 |
| 7,516,011 | B1 * | 4/2009 | Kabel et al. | 701/211 |
| 2003/0025719 | A1 * | 2/2003 | Palmer et al. | 345/700 |

* cited by examiner

*Primary Examiner* — Redhwan K Mawari
*Assistant Examiner* — Rodney P King
(74) *Attorney, Agent, or Firm* — Angel N. Gerdzhikov; Donna P. Suchy; Daniel M. Barbieri

(57) ABSTRACT

The present invention provides systems, apparatus and means to perform various FMS flight plan edits and definition of navigation reference fixes using interactive graphical representations displayed on an MFD rather than a text-based CDU. In two of the embodiments of the present invention, means are provided where minimal pilot actions, i.e., shortcuts, (which may also include entry/adjustment of a numerical value) are performed on an electronic display that accomplish particular flight plan edits as compared to several pilot actions when using a CDU to perform the same edits. In another embodiment of the present invention, a means is provided where the data entry method is graphical in nature rather than alphanumeric text for inserting an airway into a flight plan. The alphanumeric identifiers are represented as graphical objects which are selectable. In yet another embodiment, the present invention teaches a means for a flight plan modification consisting of the entry or bidirectional adjustment of a parallel offset value directly on an electronic map. In another embodiment, the present invention includes the display of a dialog box showing interactive lists of the available instrument procedures for the selected airport which is displayed on an electronic map. The display lists remain in view after selections are made with the active selection and new selection highlighted differently in the list. In another embodiment of the present invention, a means is provided to allow entry/adjustment of navigation reference fix input data directly on the electronic map. Graphical navigation reference fix symbology is dynamically positioned on the electronic map while the input data value is being adjusted.

19 Claims, 31 Drawing Sheets

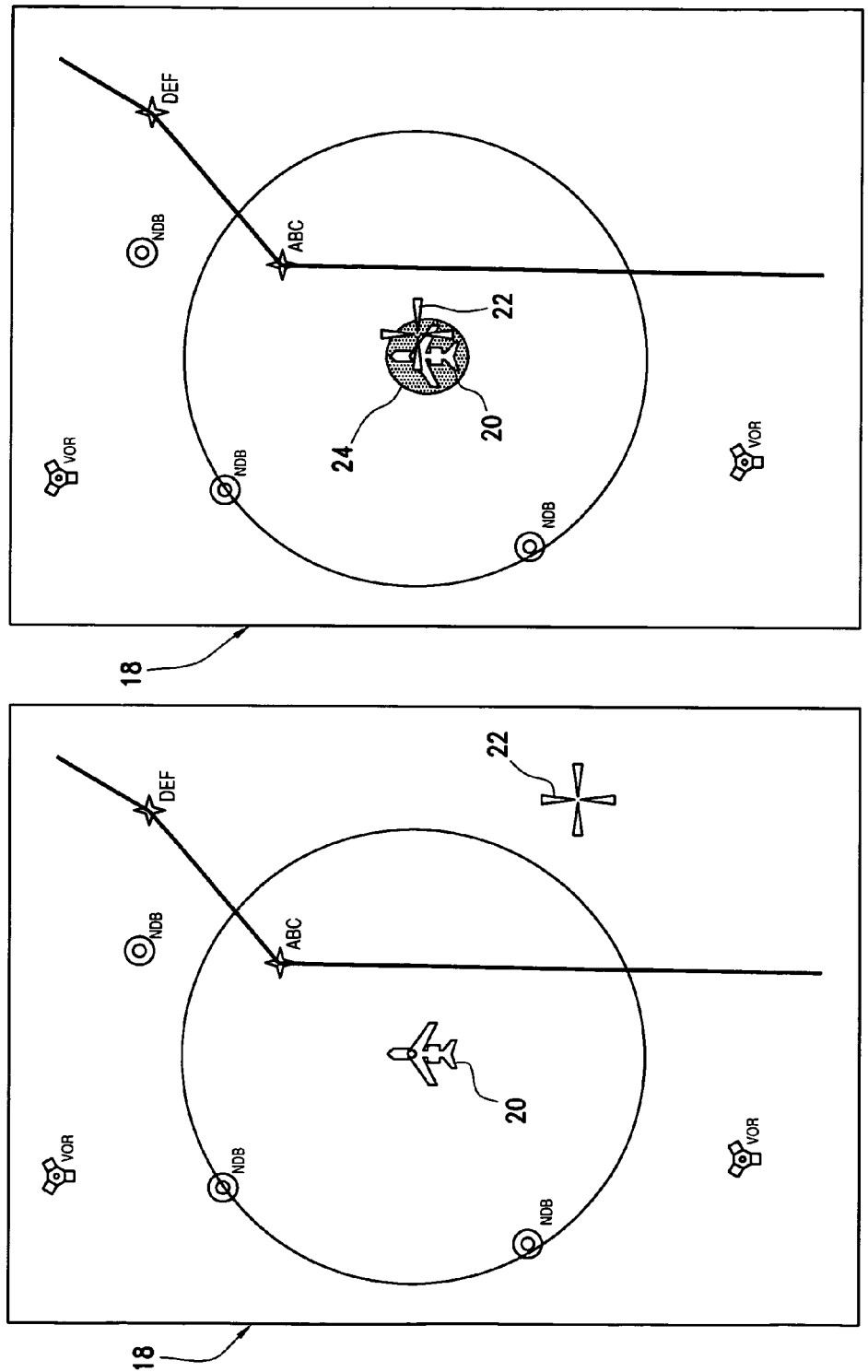

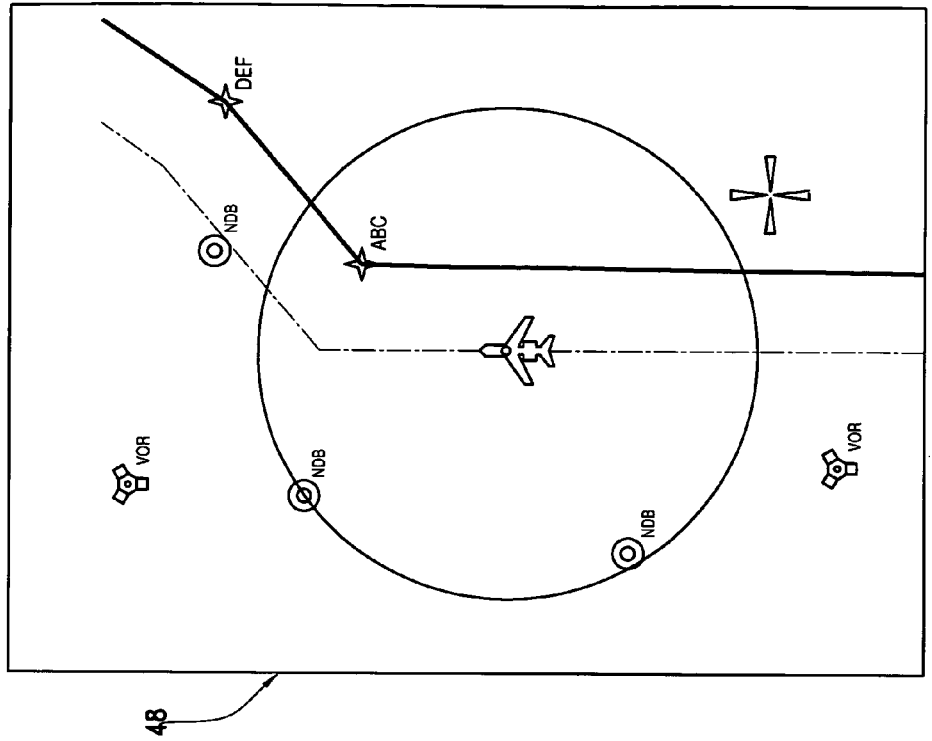
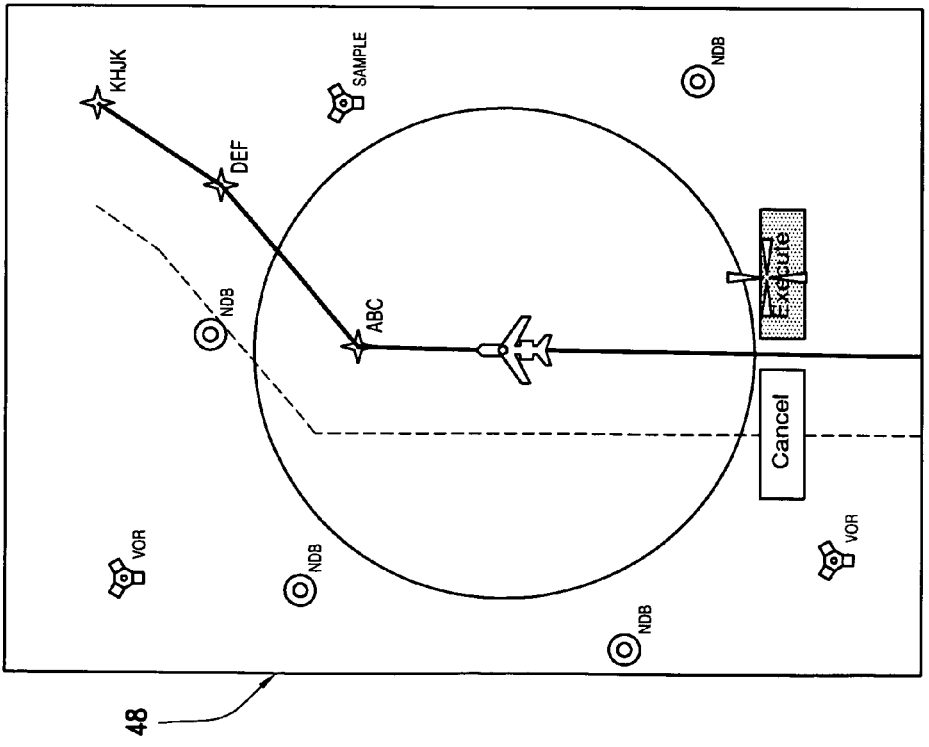
FIG. 4H
FIG. 4G

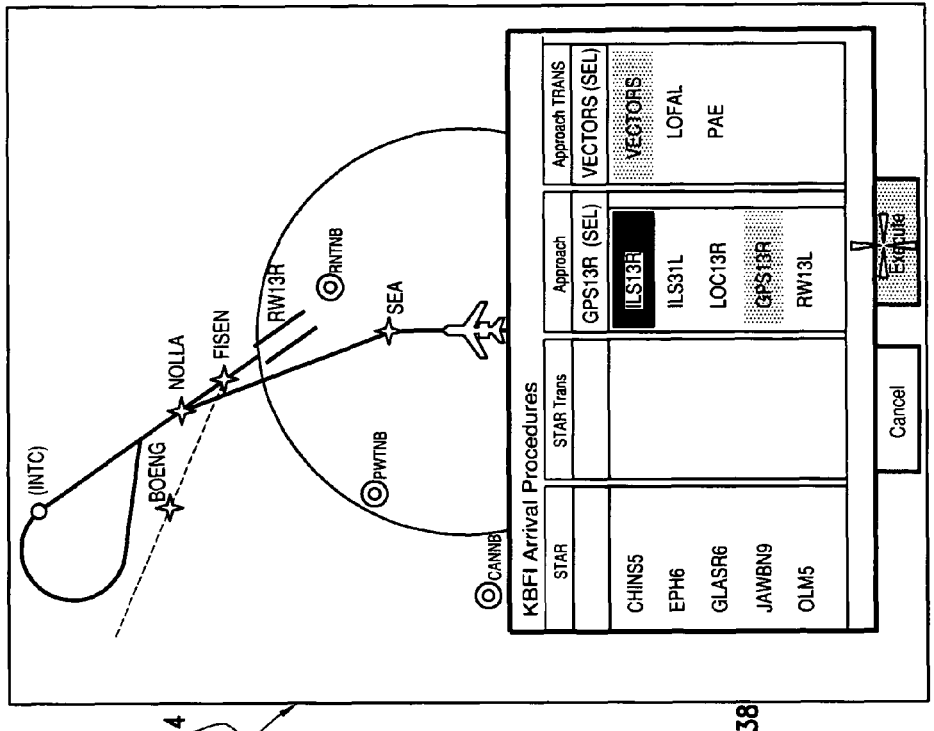
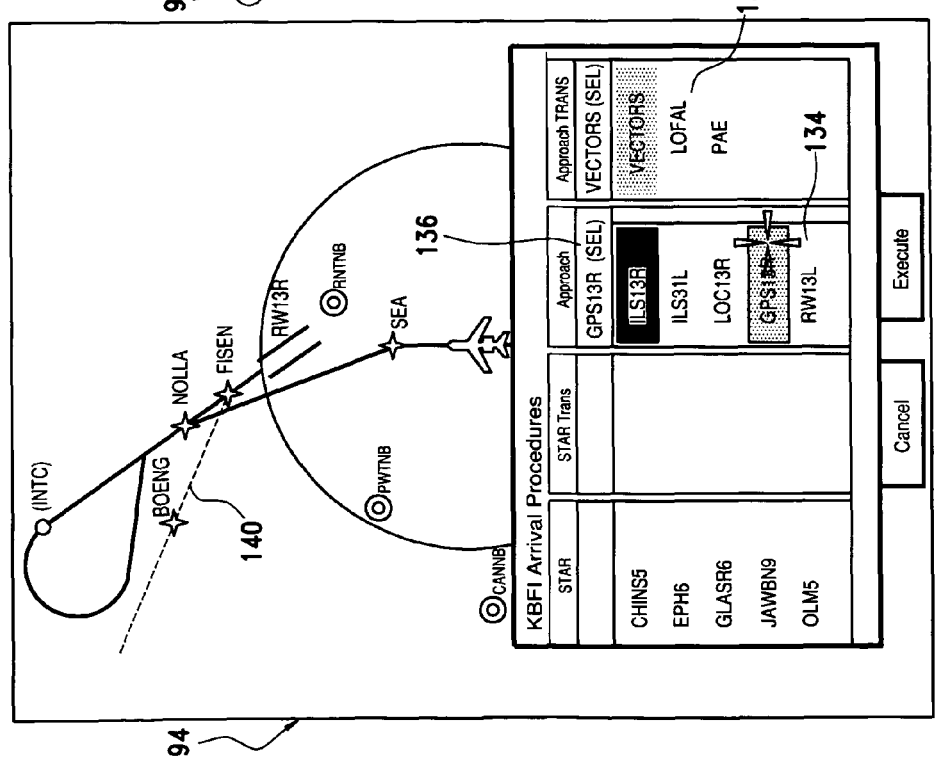
FIG. 6Q
FIG. 6R

ENHANCED GRAPHICAL FLIGHT PLANNING FOR A FLIGHT MANAGEMENT SYSTEM

BACKGROUND OF THE INVENTION

1. Field of the Invention

The present invention relates generally to aircraft avionics systems, and more particularly to a system for optimizing the pilot interface with the flight management system (FMS).

2. Description of the Related Art

Flight management systems (FMS') for aircraft, which use a Control Display Unit (CDU) as the only pilot user interface, are inherently inefficient in some cases. These inefficiencies are manifested in terms of the amount of time, the number of steps and/or the entry method the pilot is forced to use to input/adjust flight plan parameters. This situation is further compounded when the input is made via the CDU while the displayed results are observed on the electronic map of a Multi-Function Display (MFD).

This is due in part to the distribution of the controls located on the CDU that are a combination of both dedicated hard keys and line select soft keys. In addition, the CDU user interface is limited to entry of discrete alphanumeric values using an alphanumeric keypad. Other factors include the small electronic display of the CDU which provides textual input/output data display only. The CDU text data has to be distributed among multiple pages and formats to provide all of the flight plan information due to the small display area with the corresponding graphical results being displayed elsewhere (i.e., on the MFD).

Because of these factors, using the CDU as the pilot interface for modifying flight plans sometimes has the disadvantage of high pilot workload for the following reasons:

The CDU requires significant amounts of heads-down time due to complexity of operation.

Several pilot actions are required to complete certain flight plan modifications.

The CDU requires multiple learned steps in a specific order to complete certain flight plan modifications.

For certain flight plan modifications which relate to information found on aeronautical charts, the pilot must either know from memory the correct alphanumeric identifier or visually locate the identifier on a paper/electronic chart before data entry into the CDU is possible.

Multiple pages must be re-accessed and multiple selections must be re-made on the CDU to select a different item from the same display lists after an active selection has been made. In addition, awareness of the active selection is lost since the display lists are context sensitive and updated to reflect the current selection only. In cases where it's desired to review the active selection from the list, the pilot must select yet other CDU pages.

Use of a CDU requires a division of pilot attention between two devices. These are the CDU which is a heads-down device and the electronic map displayed on an MFD which is a heads-up device.

Entry of the desired value into the CDU, especially when it may need adjustment, is by trial and error. A value is entered and the graphical result is displayed on the MFD. Another value is entered and the new graphical result is displayed on the MFD. These operations are repeated until the desired result is displayed on the electronic map of the MFD.

U.S. Pat. No. 6,856,864, issued to M. J. Gibbs, et al, entitled "Method and System For Entering Data Within a Flight Plan Entry Field," discloses systems, apparatus and methods for entering data into a flight plan entry field which facilitates the display and editing of aircraft flight-plan data. In one embodiment, the invention provides a method for entering multiple waypoint and procedure identifiers at once within a single a flight plan entry field. In another embodiment, the invention provides for the partial entry of any waypoint or procedure identifiers, and thereafter relating the identifiers with an aircraft's flight management system to anticipate the complete text entry for display. In yet another embodiment, the invention discloses a method to automatically provide the aircraft operator with selectable prioritized arrival and approach routing identifiers by a single manual selection. In another embodiment, the invention is a method for providing the aircraft operator with selectable alternate patterns to a new runway.

U.S. Pat. No. 6,633,810, issued to H. M. Qureshi, et al, entitled "Graphical System and Method for Defining Pilot Tasks, Patterns and Constraints," discloses various embodiments that provide dialog boxes in response to pilot commands so that task parameters may be input or modified. Pilot tasks include "direct-to", "hold", "procedure turn", "cross with flyover", "show info", "orbit", "radial", and the like. According to various embodiments, certain dialog boxes include graphical functionality and incorporate 'human factors' enhancements such that information is efficiently presented in a manner that corresponds to air traffic control instructions.

The embodiments of the prior art reduce certain aspects of the high pilot workload and inefficiencies associated with an FMS CDU user interface but are still lacking in many areas. The various embodiments of the present invention further reduce the high pilot workload and are more efficient in some of these other areas, using different methods and techniques as compared with the prior art, as will be disclosed below.

SUMMARY OF THE INVENTION

In one broad aspect, the present invention is a system for performing an expedited graphical flight plan edit for an aircraft. The system comprises a flight management system (FMS) for an aircraft; a multi-function display (MFD) operatively connected to the FMS; and, a cursor control device (CCD) operatively connected to the MFD. The CCD is configured to interact with the MFD as the user interface to the FMS for performing shortcut graphical flight plan edits. Expedited graphical flight planning operations include—Expedited Direct To, Expedited Vertical Direct To, Vectors to Final, and Sequence Vectors. Pilot actions performed on the MFD accomplishes the flight plan edit as compared to several pilot actions when using the CDU. By combining the operations with the other related edit operations graphically, pilot workload is reduced as it eliminates heads-down time and abbreviates the number of actions required to complete the flight plan modification In another broad aspect, the present invention is embodied as a system for performing a waypoint vertical direct to graphical flight plan edit for an aircraft. In addition to the elements noted above, an analog input control (AIC) device is used for controlling a numerical value. The AIC device is operatively connected to the display so that the CCD and the AIC device are so arranged and configured to interact with the MFD as the user interface to the FMS for performing a waypoint vertical direct to graphical flight plan edit. The CCD presents a task menu including a virtual task button on the MFD. The virtual task button includes a button window having a display readout which is modifiable by the user. After entry/adjustment of the numerical value is finished, selection of the virtual button via the CCD not only accepts the value but also causes the flight plan edit to be sent from the MFD to the FMS for processing. This graphical flight planning task using the CCD on the electronic map results in a single combined edit provided to the FMS rather than using the CDU which requires separate uncombined steps to perform the same operation. By combining the operations with the other related edit operations graphically, pilot workload is reduced as it eliminates heads-down time and abbreviates the number of actions required to complete the flight plan modification.

In another broad aspect, the system performs a parallel offset graphical flight plan edit for an aircraft. The CCD presents a task menu comprising a virtual button on the MFD which is replaced by a course line, a display dynamic readout, and a ghost aircraft. Manipulation of the AIC device provides adjustment of a value of the display dynamic readout and commensurate dynamic positioning of the display dynamic readout, the course line and the ghost aircraft. Completion of an entry using the CCD completes the parallel offset adjustment. The pilot's attention can be undivided and focused on the electronic map since the data entry and graphical results are displayed in the same location on the same device. Because of this fact and that this embodiment also eliminates the trial and error input value adjustment situation, pilot workload is minimized for this type of FMS flight plan modification.

In another broad aspect, the system performs an airway insertion graphical flight plan edit for an aircraft. The CCD presents a waypoint task menu comprising a virtual button on the MFD which, upon selection of an airway task the waypoint task menu is replaced by an airways dialogue box. The airways dialogue box comprises a circle denoted by a selected waypoint. The circle has a plurality of optional airways extending therefrom. Manipulation of the AIC device provides graphical highlighting of a desired airway. Selection of an identifier region from the airway exit identifier list results in the appearance of a proposed airway flight plan edit on the display. Completion of an entry using the CCD completes the flight plan modification. This avoids requiring the pilot to manually type the alphanumeric name using the keyboard, eliminates any possibility for typographical errors and all available identifiers are made visible without requiring memorization or searching on a chart.

In another broad aspect, the system performs an instrument procedure insertion/change graphical flight plan edit for an aircraft. The CCD presents an airport task menu comprising a virtual button on the MFD which, upon selection of an instrument procedure task the airport task menu is replaced by an instrument procedures dialogue box. The instrument procedures dialogue box displays a plurality of lists of available instrument procedures for the selected airport. Manipulation of the CCD provides graphical highlighting of the desired instrument procedure. Selection of the desired instrument procedure using the CCD results in the flight plan to be modified to include the selected instrument procedure, the selected instrument procedure highlighted in the list, the selected instrument procedure displayed in a readout window above the list, the display lists to remain in view after the selection is made and the appearance of the selected instrument procedure on the display. In cases where there is both an active procedure and a newly selected procedure, both are highlighted differently in the list. This embodiment has two advantages since all available instrument procedures remain visible. It avoids memorization of the active instrument procedure selections which are separate from any new selections currently made and also reduces pilot workload in cases where changes to the instrument procedure selections are required.

In another broad aspect, the system performs a graphical definition of a navigation reference fix for an aircraft. The CCD presents a task menu comprising a virtual button on the MFD which, upon selection of a fix task the task menu is replaced by a fix dialogue box. The fix dialogue box allows for entry and/or adjustment of navigation reference fix input data which can be observed directly on an electronic map. Manipulation of the CCD selects the desired fix input parameter for adjustment. Manipulation of the AIC provides adjustment of the numerical value while graphical navigation reference fix symbology is dynamically positioned on the electronic map which correlates to the numerical value displayed in the fix dialogue box. After entry/adjustment of the value is finished, selection is made via the CCD control which causes the navigation reference fix value to be sent from the MFD to the FMS for further processing. The pilot's attention can be undivided and focused on the electronic map since the data entry and graphical results are displayed in the same location on the same device. This embodiment also eliminates the trial and error input data adjustment situation, thereby reducing pilot workload for this type of FMS operation.

BRIEF DESCRIPTION OF THE DRAWINGS

FIG. 2A illustrates a multi-function display format for an aircraft showing an electronic map with an aircraft symbol flying off track from the desired route to meet waypoints to illustrate a first embodiment of the present invention.

FIG. 2B shows a first step in performing a flight plan edit by stewing the cursor over the aircraft object and highlighting this region which brings a graphical flight planning task menu into view.

FIGS. 4A-4H are screen shots of a third embodiment of the present invention showing "Parallel Offset."

DETAILED DESCRIPTION OF THE INVENTION

Figure 1:
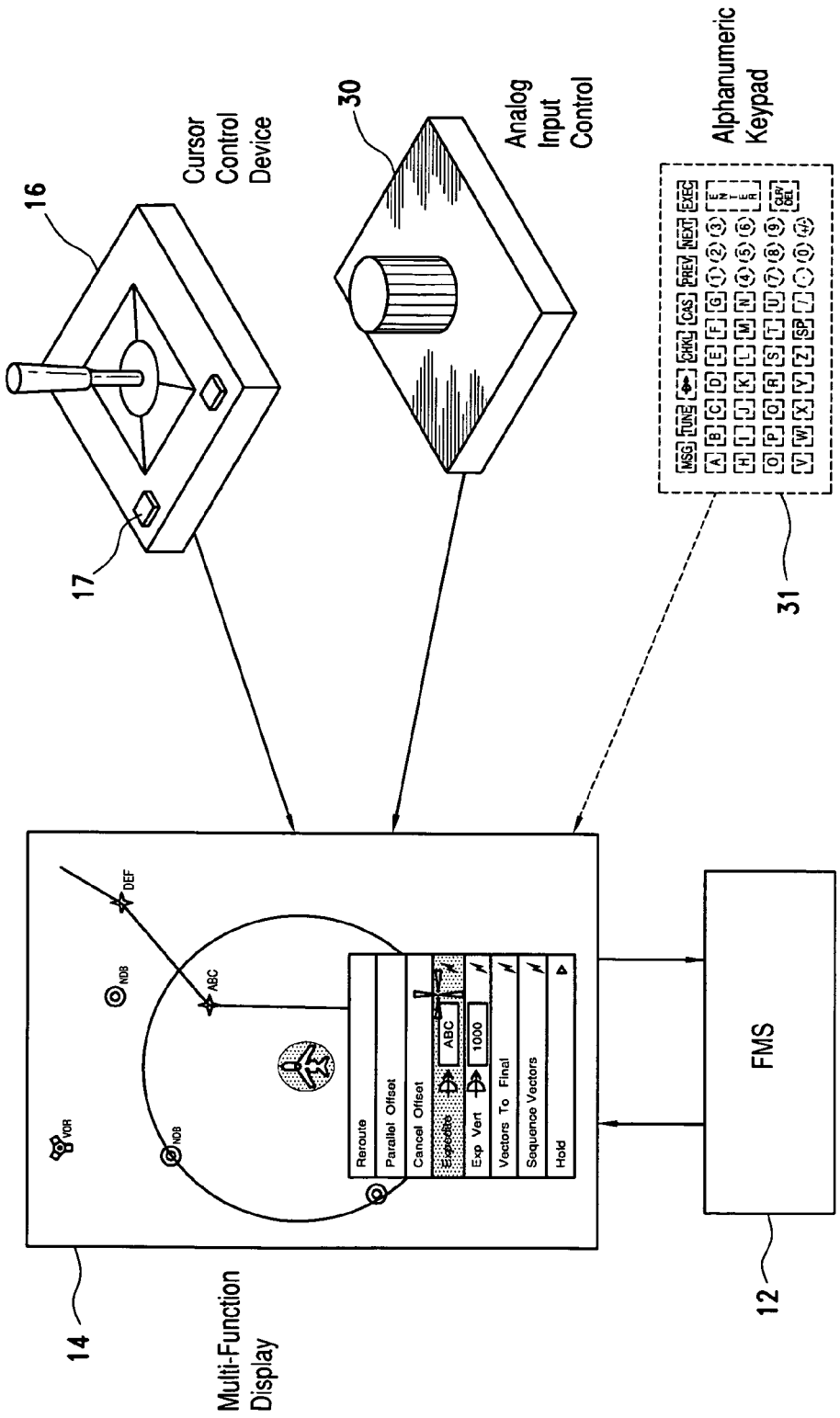
FIG. 1 is a system block diagram of the present invention.

Referring now to the drawings and the characters of reference marked thereon, FIG. 1 illustrates a system for performing an expedited graphical flight plan edit for an aircraft, designated generally as 10. The system 10 includes a flight management system (FMS) 12 which may be a type that is typical in this field such as that manufactured by present assignee, Rockwell Collins, Inc. A multi-function display (MFD) 14 is operatively connected to the FMS. The MFD 14 is also of a type known in this field. The MFD represents any electronic flight display which is capable of displaying an electronic map format that includes an FMS generated flight plan. A cursor control device (CCD) 16 is connected to the MFD 14. It may be, for example, a joystick, trackball, touch pad, or mouse. Cursor control could alternatively be provided via arrow keys on an alphanumeric keypad. The display format presented on the MFD is utilized for performing a desired edit to a flight plan. The CCD 16 preferably has at least one pushbutton 17.

Figure 2C:
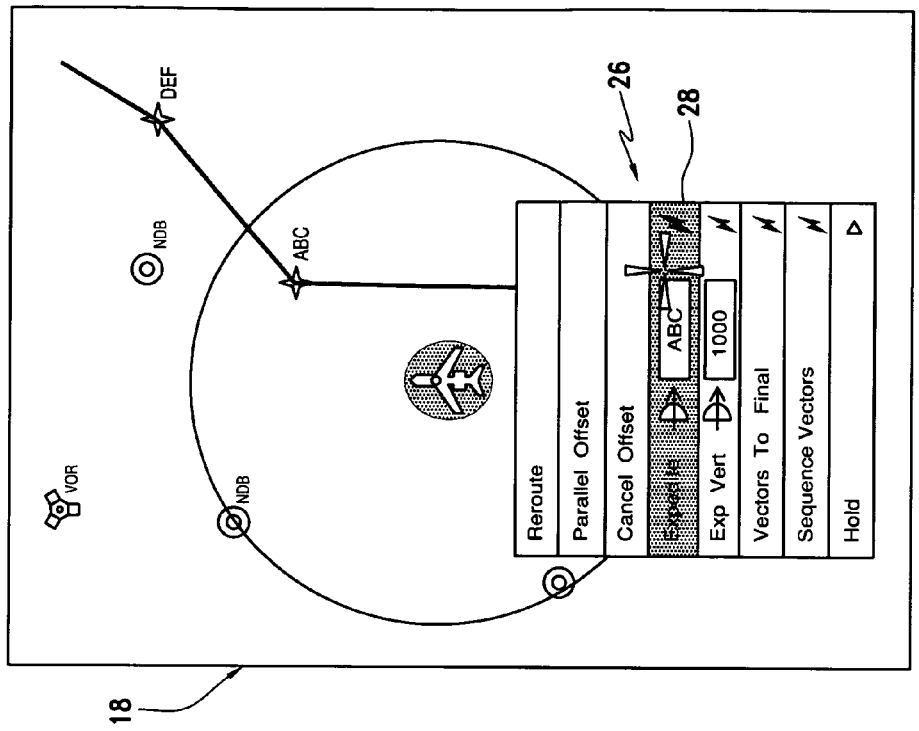
FIG. 2C shows the presentation of this graphical flight planning task menu into view on the display.

Referring now to FIGS. 2A-2E, a first embodiment of the present invention is illustrated in which the system 10 is utilized to perform a direct to flight plan edit on the FMS which is a shortcut method. In FIG. 2A, an electronic display format 18 is illustrated showing an aircraft 20 off track from the desired flight plan route to waypoints ABC and DEF. The display includes a cursor 22 that can be positioned via a CCD, typically a joystick.

Figure 2D:
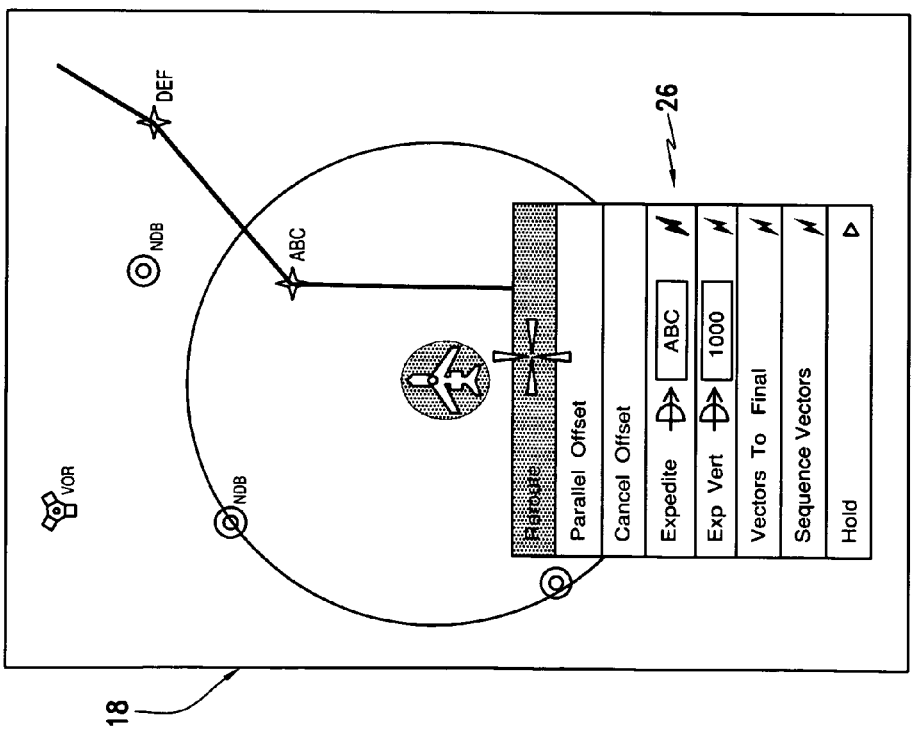
FIG. 2D shows a cursor positioned at an "Expedite Direct-To" task region of interest to highlight this region and select the "Expedite Direct-To" task.
Figure 2E:
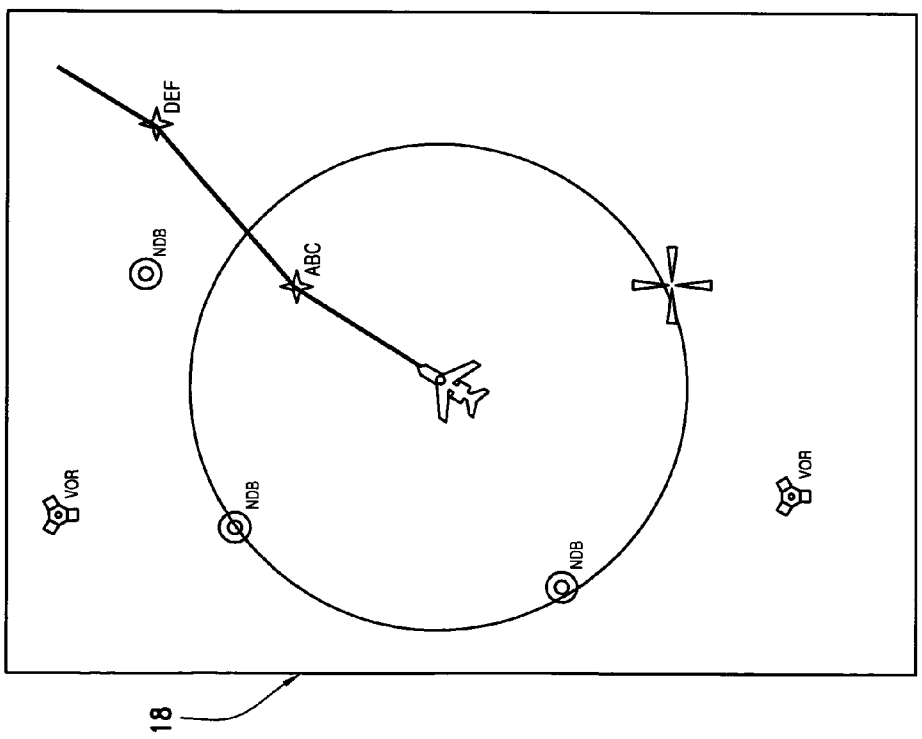
FIG. 2E illustrates execution of the resultant flight plan modification showing the editing of the flight plan to waypoints ABC and DEF.

In FIG. 2B the cursor 22 is positioned in the region 24 of the aircraft symbol 20 to highlight this region 24. The pushbutton on the joystick can be used to bring the aircraft task menu 26 into view (as shown in FIG. 2C). As shown in FIG. 2D the cursor is slewed over the "Expedite Direct-To" task 28 thus highlighting this task. This task 28 is a virtual button with display readout on the MFD. The real pushbutton on the CCD 16 is used to select this task. The "Expedite Direct-To" task 28 is a shortcut which allows for an expedited direct to the current active waypoint which bypasses a modified flight plan state and corresponding execute/cancel operations. The real pushbutton is used to complete the task, as shown in FIG. 2E. Thus, the pilot actions performed on the MFD accomplishes the flight plan edit as compared to several pilot actions when using the CDU. By combining the operations with the other related edit operations graphically, pilot workload is reduced as it eliminates heads-down time and abbreviates the number of actions required to complete the flight plan modification. Tasks that involve shortcuts are shown with a lightning bolt icon to illustrate that they get accomplished with a single button press.

Various other tasks can be accomplished in a similar manner such as "Exp Vertical Direct To" (shortcut that allows for a vertical direct to the active altitude constraint in the flight plan); "Vectors to Final" (shortcut to select the vectors transition for the existing approach procedure in flight plan) and "Sequence Vectors" (shortcut which sequences the vectors transition). The expedited direct to and expedited vertical direct to virtual buttons include a display readout which displays the current active waypoint and current active altitude constraint of the flight plan, respectively.

Figure 3A:
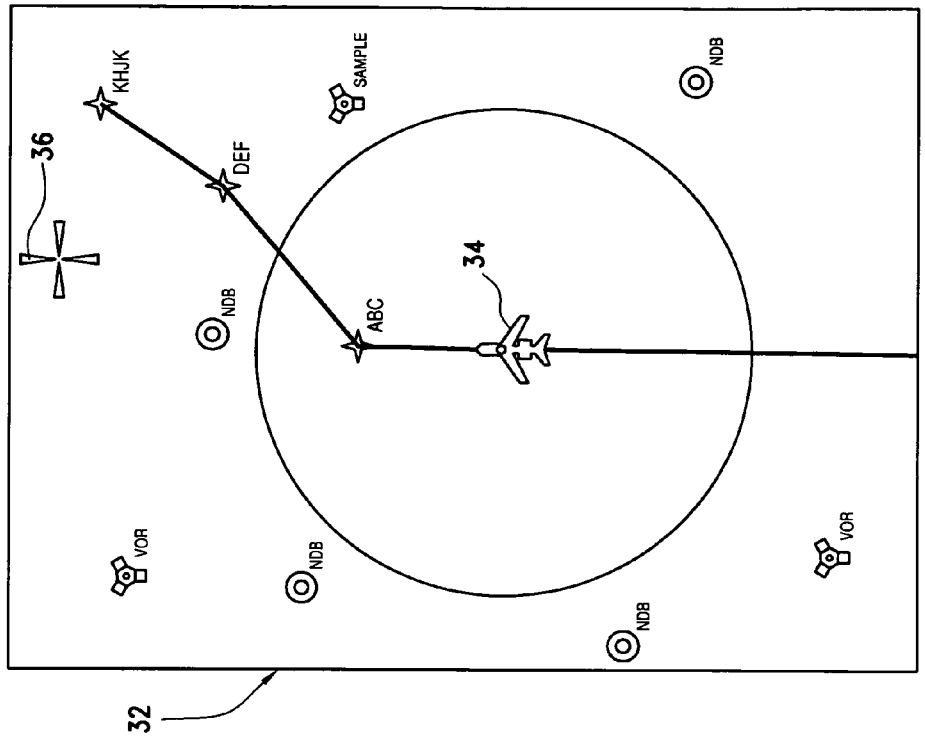
FIGS. 3A-3G are screen shots of a second embodiment of the present invention showing "Waypoint Vertical Direct To" flight plan editing.

Referring again now to FIG. 1, if an analog input control (AIC) device 30 is added, the system 10 can be used to perform waypoint vertical direct to graphical flight plan editing. The AIC device 30 may be any number of devices such as a rotary knob, dual stack rotary knob, thumbwheel or touchpad. Furthermore, AIC device 30 and the CCD 16 may be a single unit, or alternatively substituted with an alphanumeric keypad 31 shown in phantom lines. Referring now to FIGS. 3A-3G illustration of the principles of the present invention for providing waypoint vertical direct to graphical flight plan editing is shown. In FIG. 3A, an electronic display format 32 is illustrated showing the aircraft symbol 34 heading toward waypoints ABC, DEF, and KHJK. The display includes a cursor 36 that can be positioned via a CCD, typically a joystick.

Figure 3C:
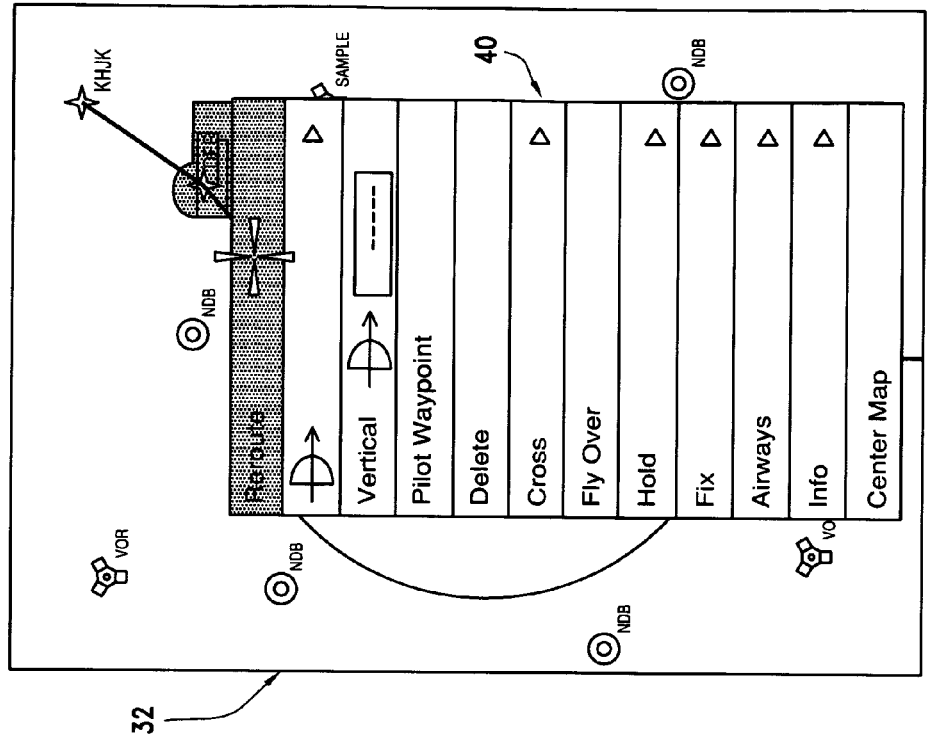
Figure 3B:
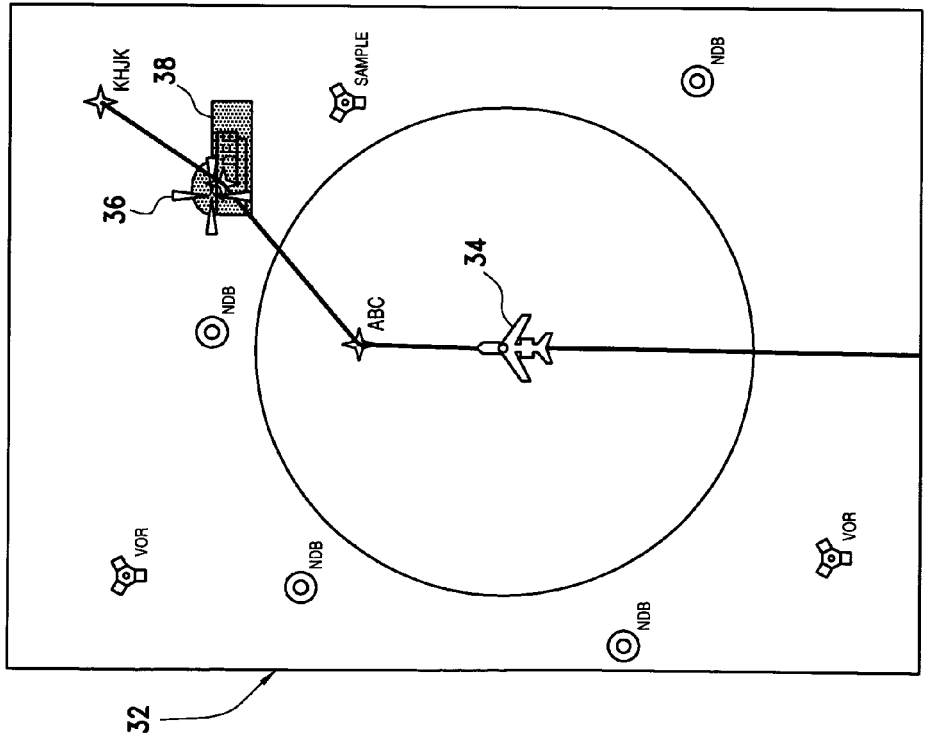
Figure 3E:
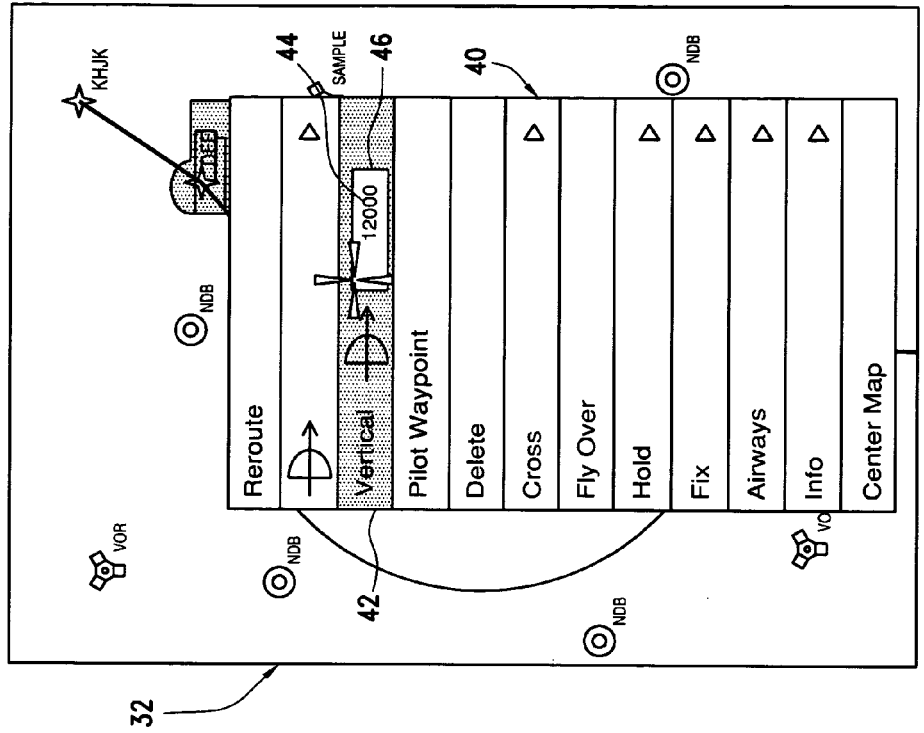
Figure 3D:
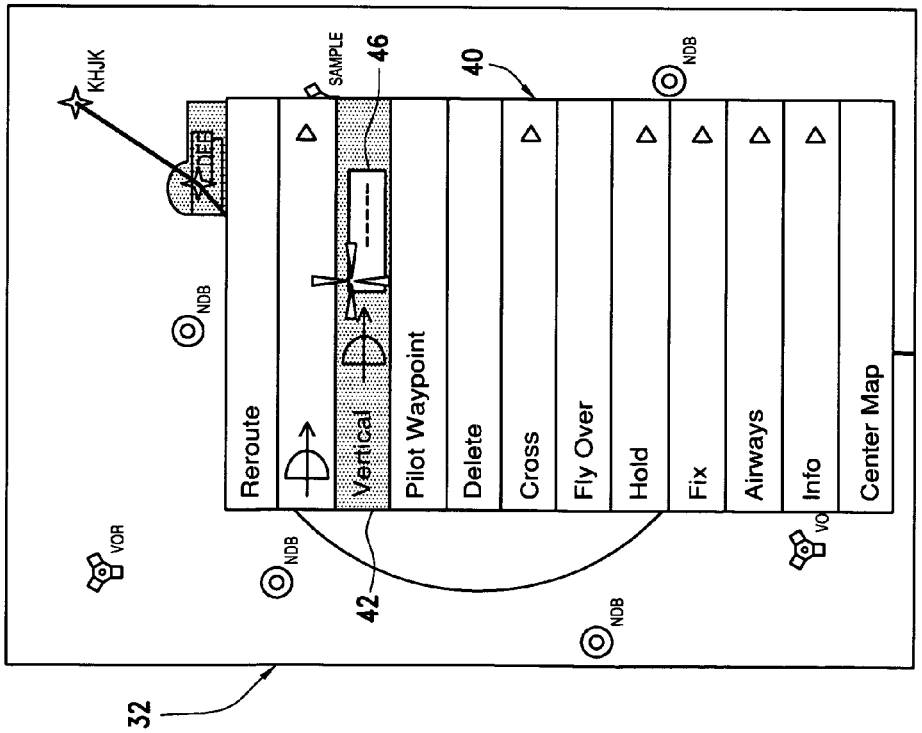
Figure 3G:
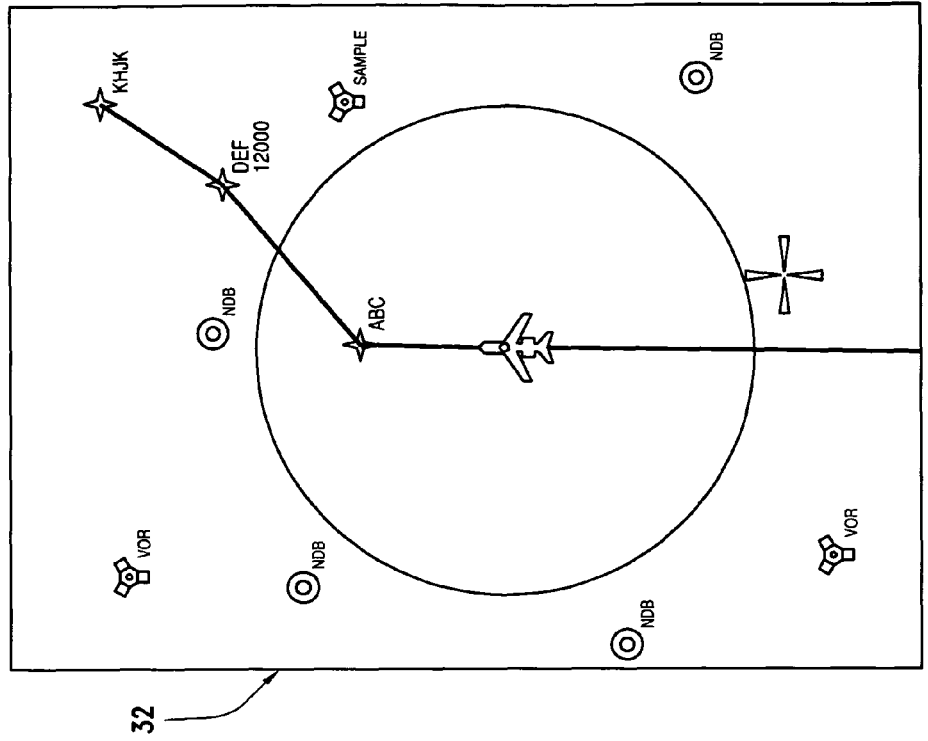
Figure 3F:
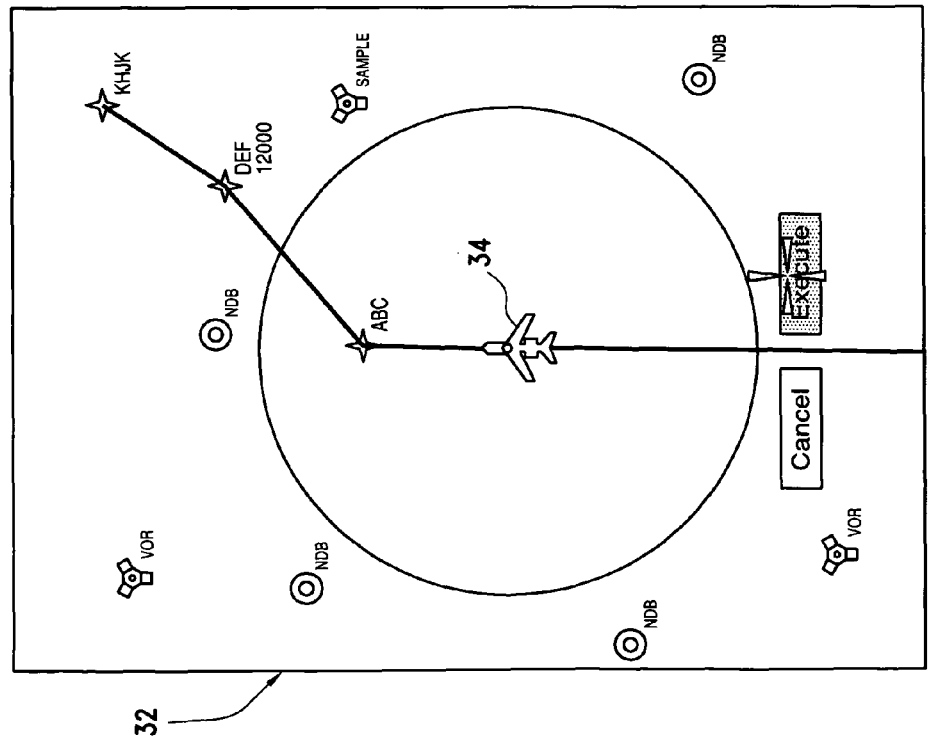

In FIG. 3B the cursor 36 is positioned in the region 38 of the waypoint DEF to highlight this region 38. The pushbutton on the CCD can be used to bring the waypoint task menu 40 into view (as shown in FIG. 3C). As shown in FIG. 3D the cursor is slewed over the "Vertical Direct to" virtual task button 42 thus highlighting this virtual task button. As shown in FIG. 3E, this provides an opportunity for the analog input device 30 to be used to enter/adjust the numerical value 44 (i.e. display readout) displayed in a button window 46 of the virtual task button 42. As can be seen in FIG. 3F, after entry/adjustment of the value is finished, selection of a virtual button via a control on the CCD 16 allows the option to be presented to allow execution of the flight plan edit. The edit is represented by the display of 12000 at waypoint DEF. Selection of the Execute button not only accepts the value but also causes the flight plan edit to be sent from the MFD to the FMS for processing. FIG. 3G illustrates execution of the waypoint vertical direct to flight plan edit.

Figure 4B:
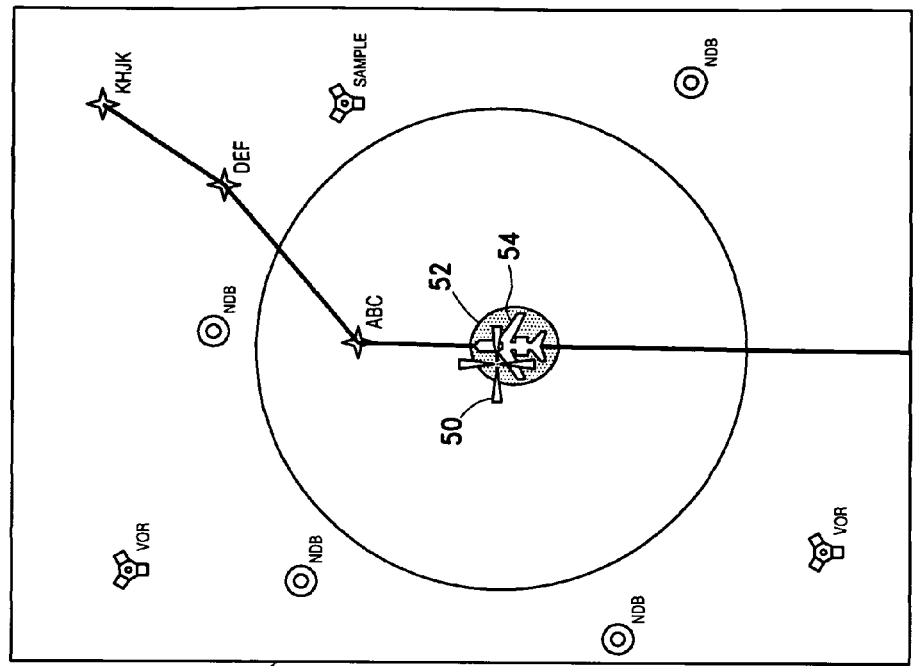
Figure 4A:
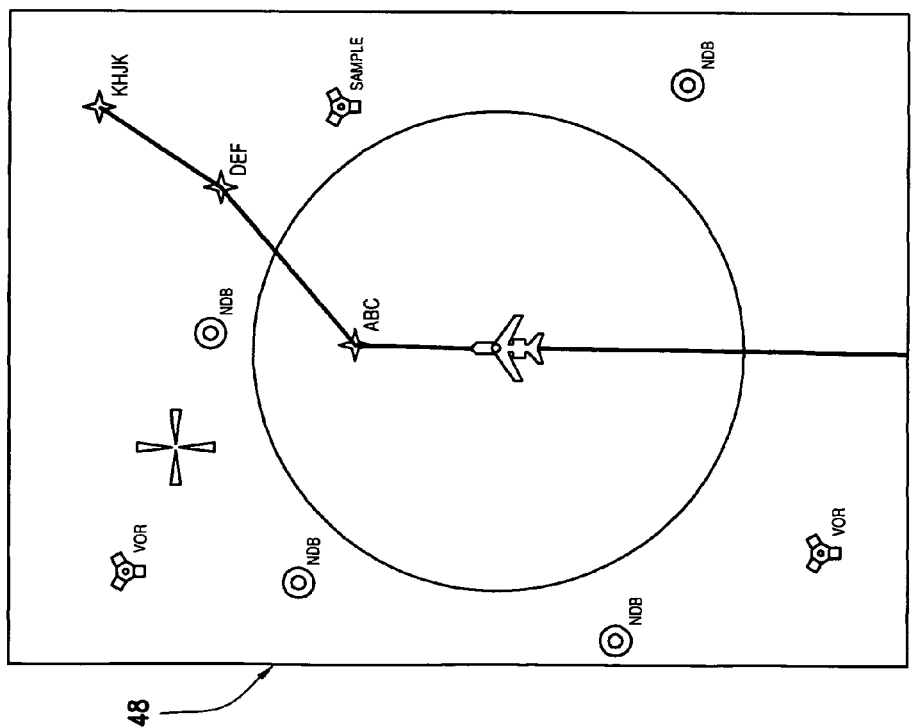
Figure 4C:
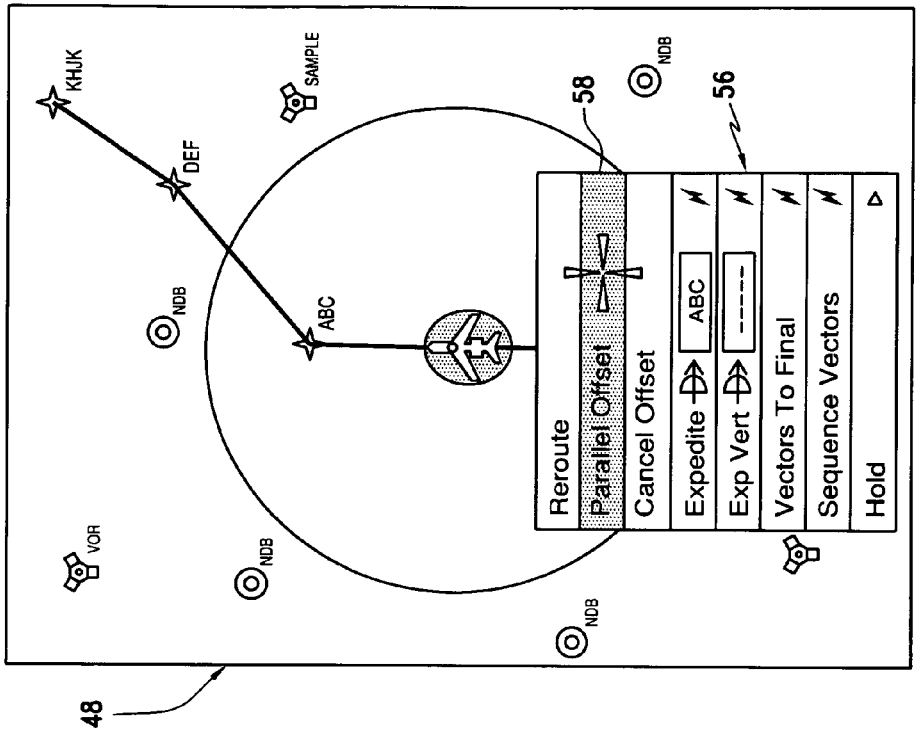
Figure 4D:
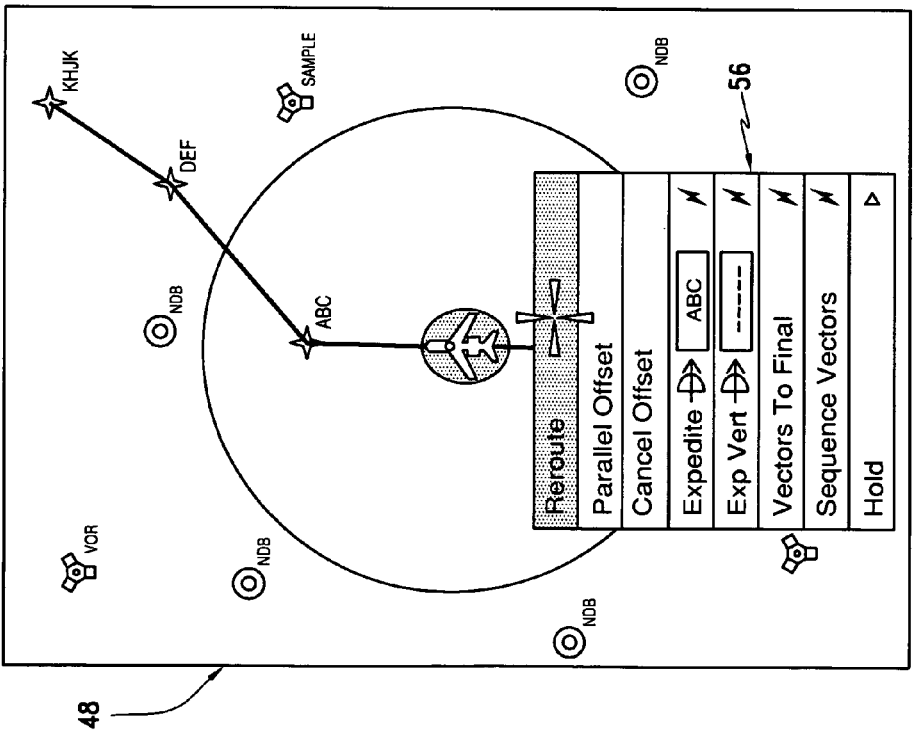

Referring now to FIGS. 4A-4H, an example of the use of the present inventive principles for performing a parallel offset graphical flight plan edit is illustrated. In FIG. 4A, an electronic display format 48 is illustrated showing an aircraft symbol heading toward waypoints ABC, DEF, and KHJK. In FIG. 4B the cursor 50 is positioned in the region 52 of the aircraft symbol 54 to highlight this region 52. The pushbutton on the joystick can be used to bring the aircraft task menu 56 into view (as shown in FIG. 4C). As shown in FIG. 4D the cursor is slewed over the "Parallel Offset" task 58 thus highlighting this task. This task 58 is a virtual button on the MFD. The real pushbutton on the CCD 16 is used to select this task.

Figure 4F:
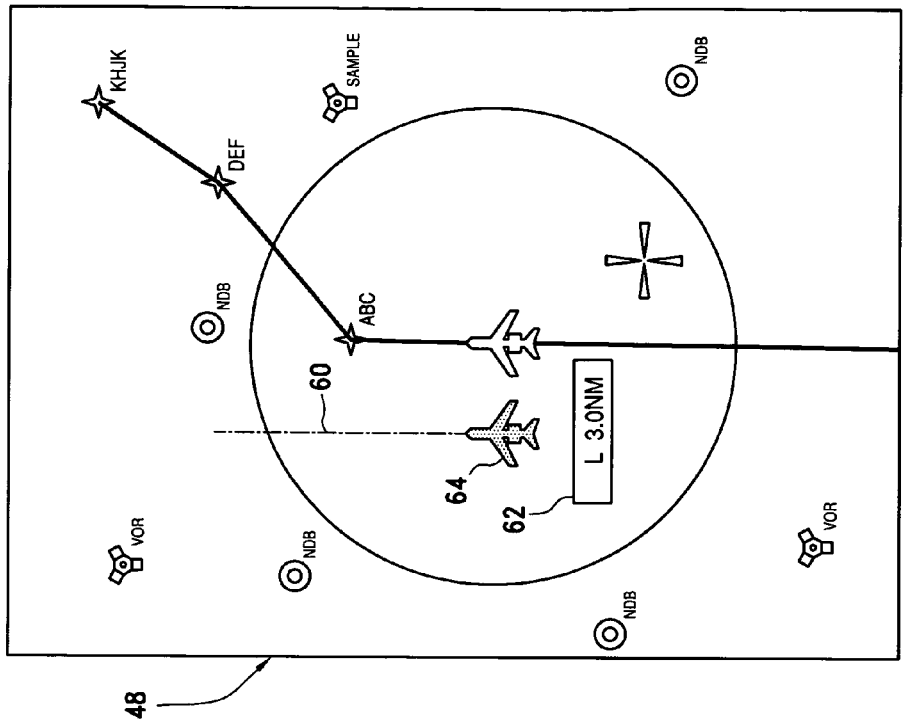
Figure 4E:
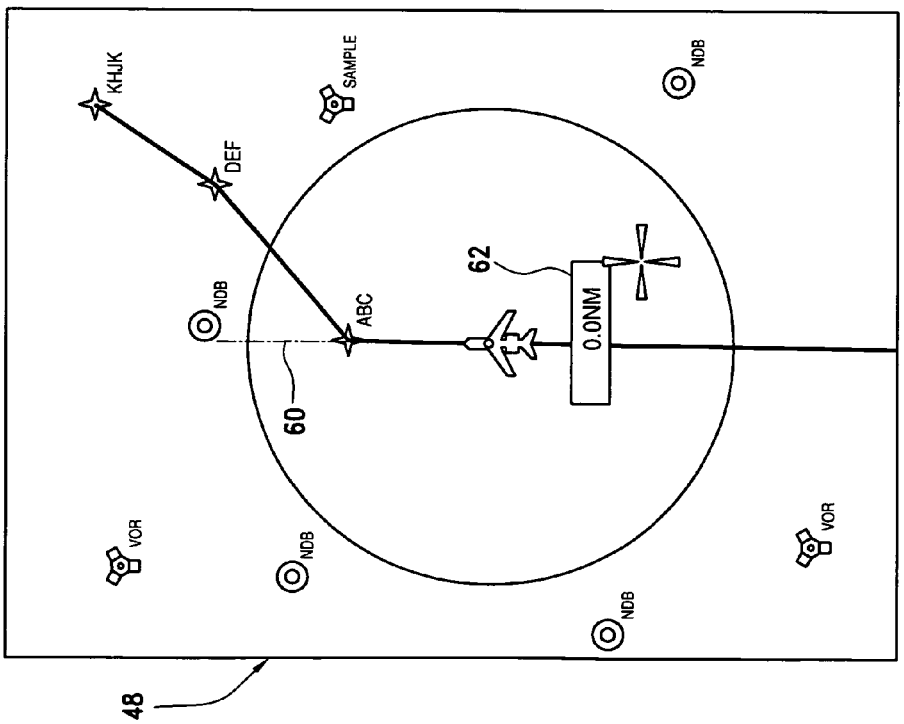

When the task is selected, the task menu 56 is replaced by a course line 60 and a display dynamic readout 62, as shown in FIG. 4E. This provides an opportunity for the analog input device 30 to be used to adjust the numerical value (i.e. display dynamic readout). As can be seen in FIG. 4F, while the value is being entered and/or adjusted, a "ghost" aircraft symbol 64, its corresponding course line 60 and digital readout 62 are dynamically positioned on the electronic map laterally offset right or left from their original positions in relation to the numerical value displayed in the digital readout. After entry/adjustment of the value is finished, the pushbutton on the CCD is used to complete the operation which then allows the option for execution of the flight plan edit, as can see in FIG. 4G. Selection of the Execute button not only accepts the value but also causes the flight plan edit to be sent from the MFD to the FMS for processing. FIG. 4H illustrates execution of the parallel offset flight plan edit.

Figure 5B:
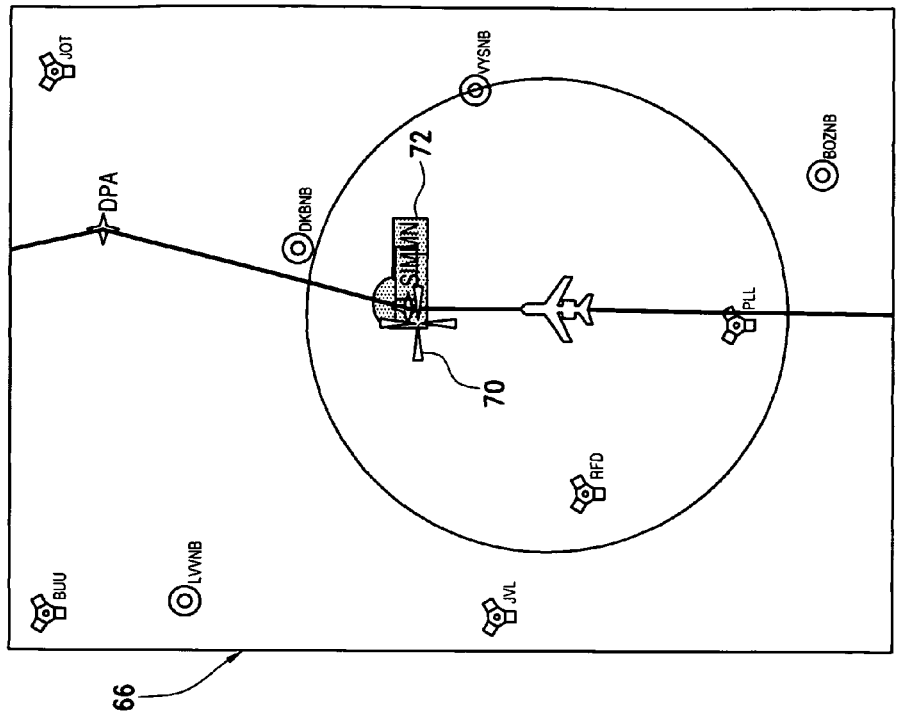
FIGS. 5A-5J are screen shots of a fourth embodiment of the present invention showing "Airway Insertion" flight plan editing.
Figure 5A:
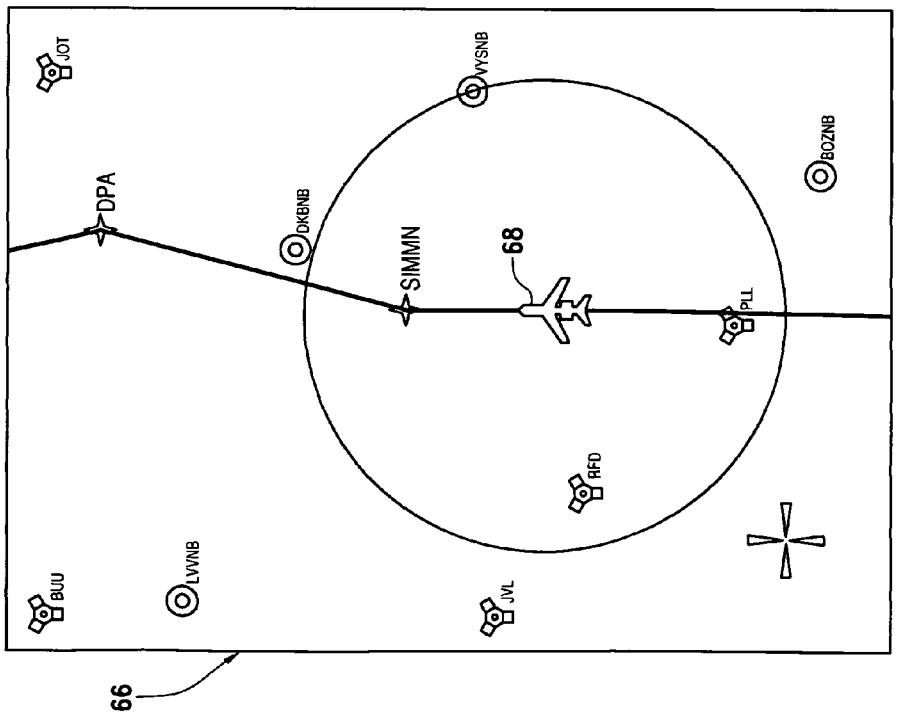
Figure 5D:
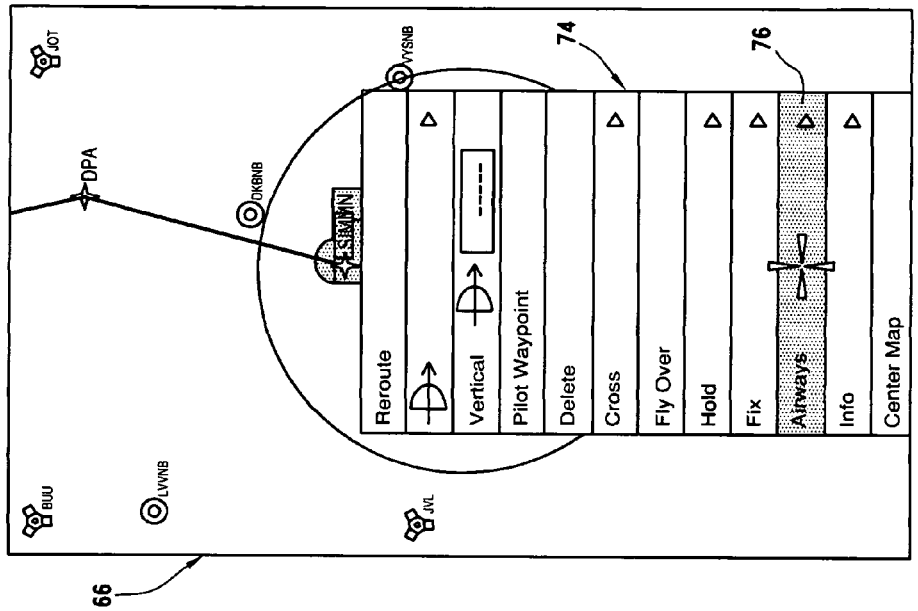
Figure 5C:
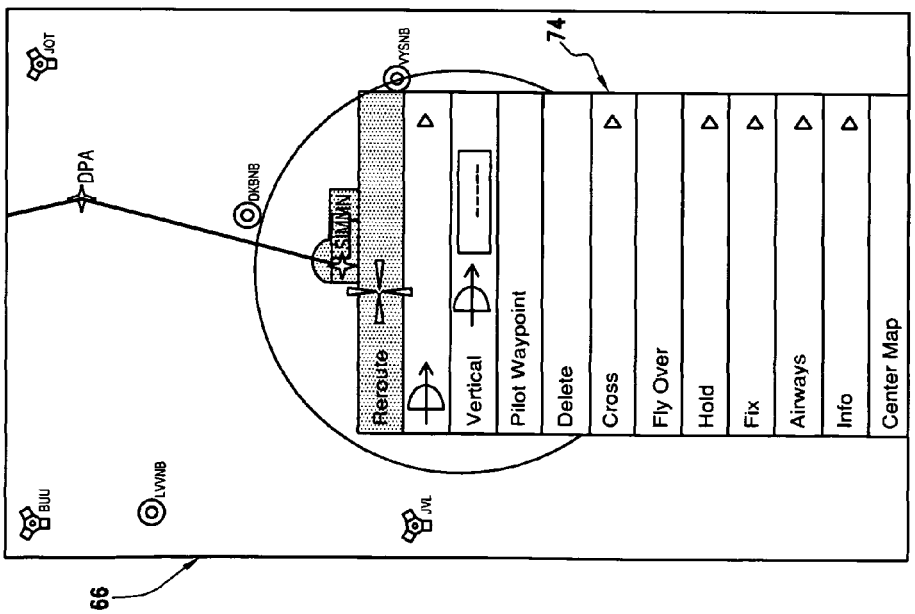
Figure 5F:
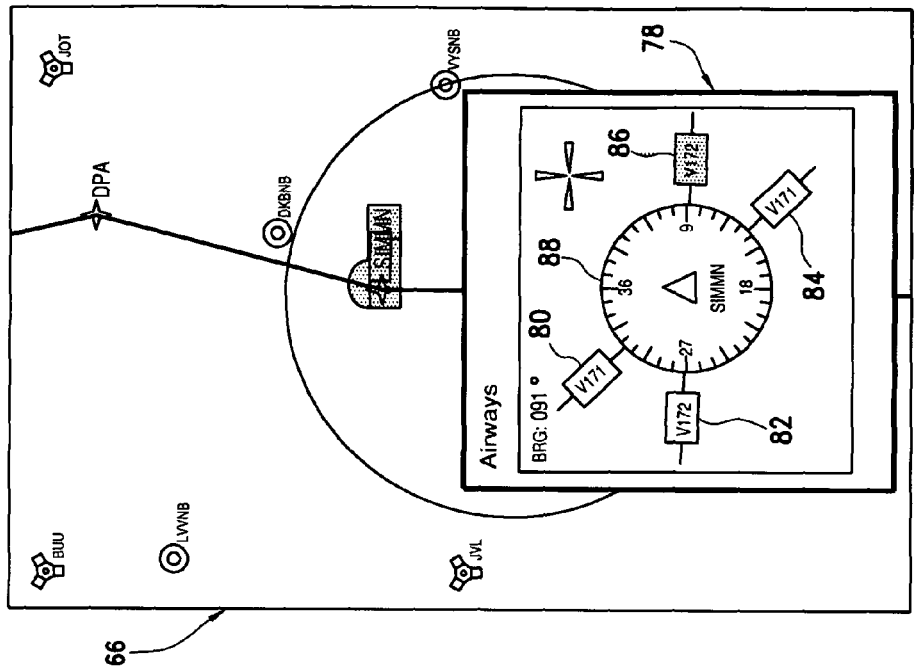
Figure 5E:
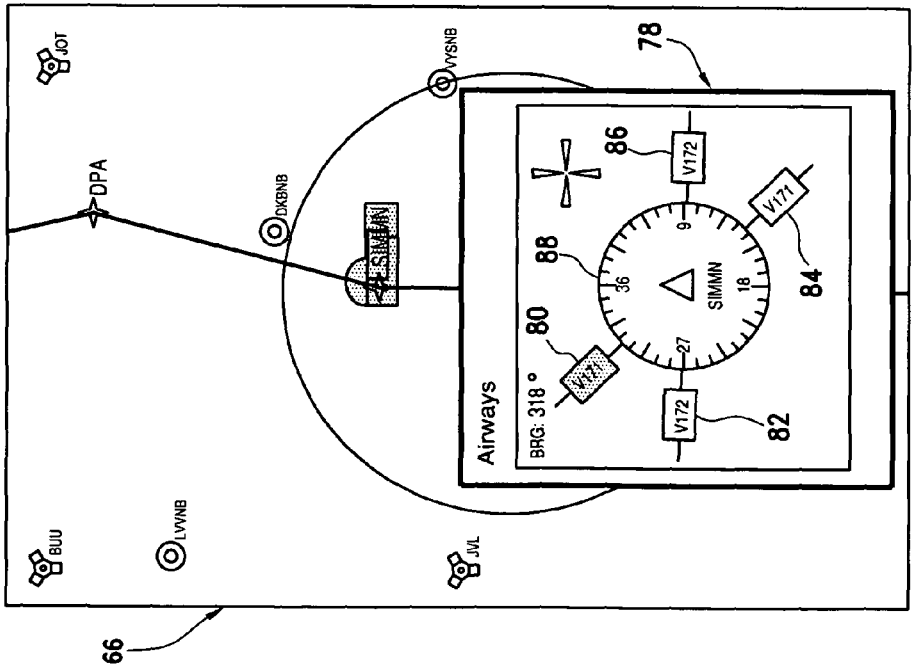
Figure 5H:
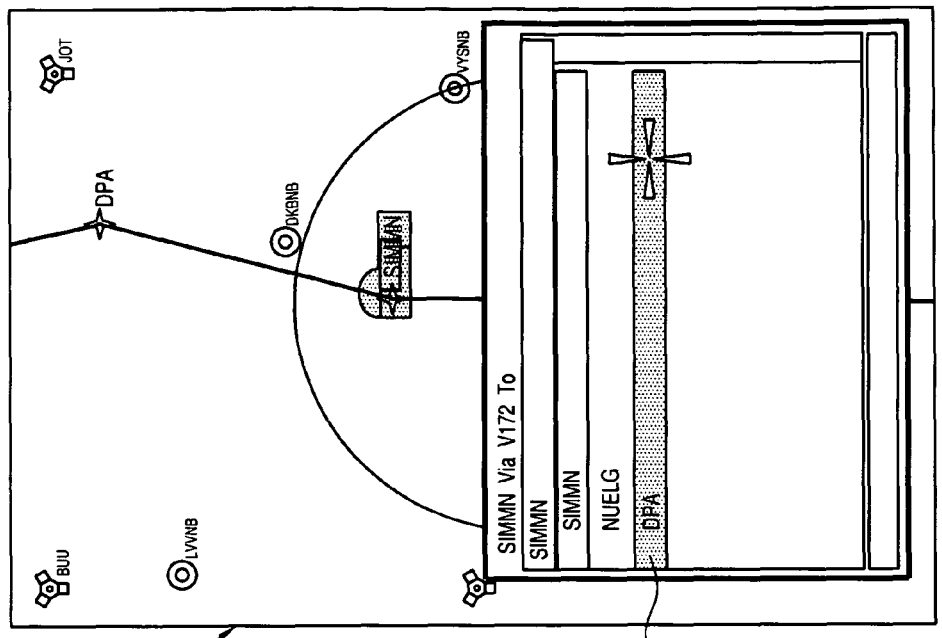
Figure 5G:
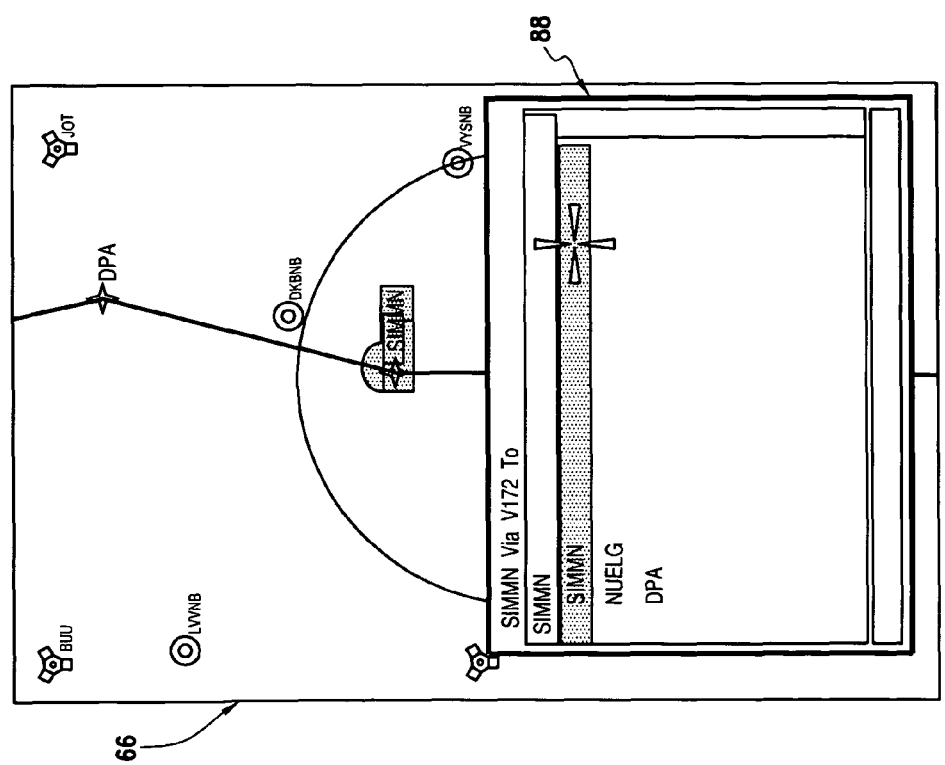
Figure 5I:
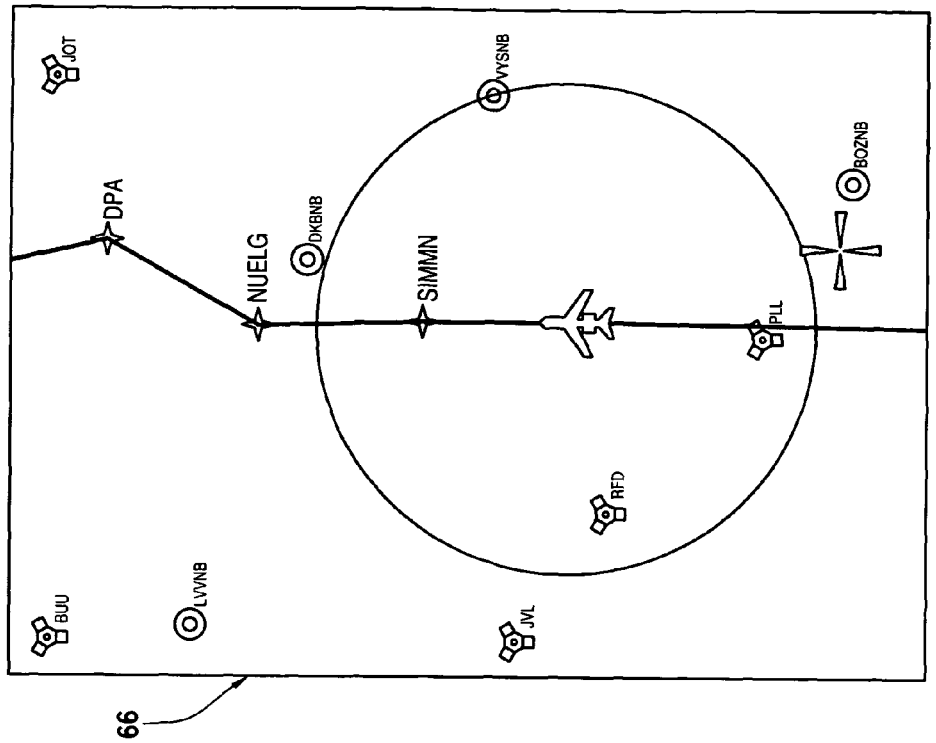
Figure 5J:
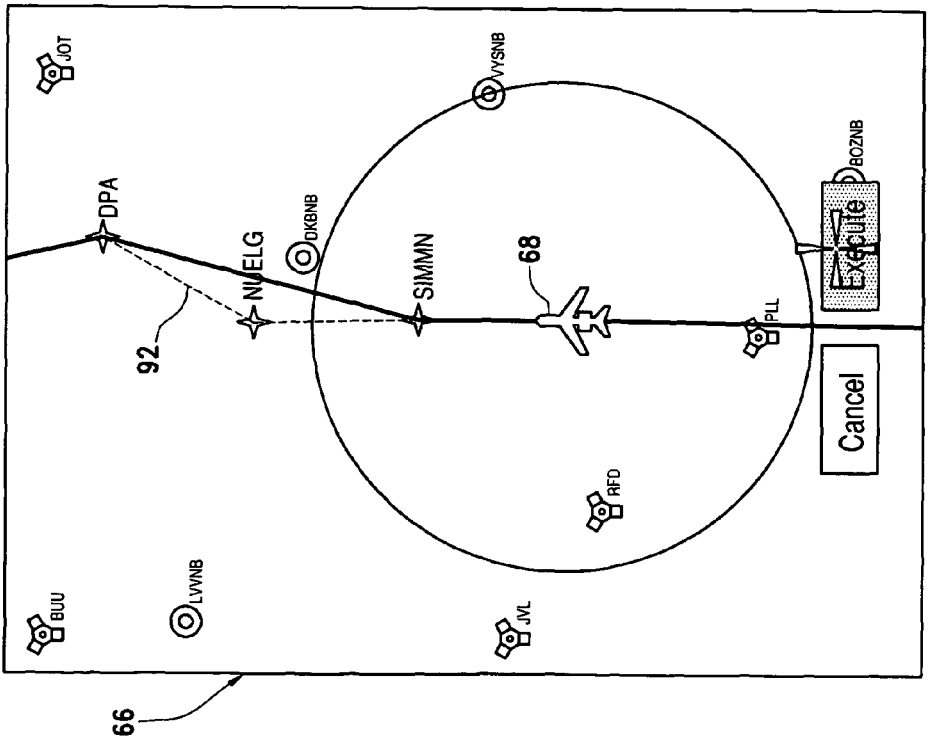

Referring now to FIGS. 5A-5J, illustration of the principles of the present invention for providing airway insertion graphical flight plan editing is shown. In FIG. 5A, an electronic display format 66 is illustrated showing an aircraft symbol 68 heading toward waypoints SIMMN, and DPA. In FIG. 5B the cursor 70 is positioned over the region of waypoint SIMMN to highlight this region 72. The pushbutton on the CCD can be used to bring the waypoint task menu 74 into view (as shown in FIG. 5C). As shown in FIG. 5D the cursor is slewed over the "Airway" task 76 thus highlighting this task. This task 76 is a virtual button on the MFD. The real pushbutton on the CCD 16 is used to select this task. When the task is selected, the task menu 74 is replaced by an airways dialogue box 78, as shown in FIG. 5E. This airways dialogue box 78 presents a variety of optional airways 80, 82, 84, 86 extending from a circle 88 about the selected waypoint, i.e. in this case SIMMN. As can be seen in FIG. 5F, the AIC is used to graphically highlight the desired airway V172, designated as 86. Selection of the desired airway, via the CCD pushbutton, results in closure of the dialogue box 78 and display of an airway exit identifier list 88 shown in FIG. 5G. The cursor is then slewed over the DPA identifier region 90 to choose that as the airway exit identifier, as shown in FIG. 5H. Once the DPA identifier region 90 is chosen, the proposed airway insertion flight plan edit appears on the display as indicated by a dashed line 92, as shown in FIG. 5I. If the command is executed, the flight plan modification is sent to the FMS for processing and the new flight plan appears on the display, as shown in FIG. 5J.

Figure 6B:
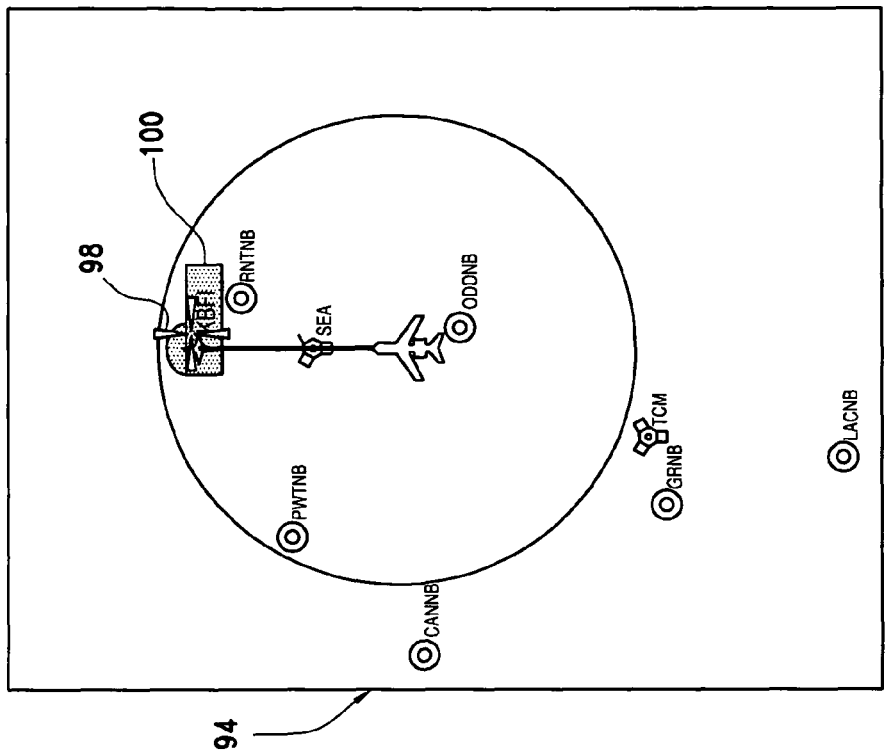
FIGS. 6A-6S are screen shots of a fifth embodiment of the present invention showing "Instrument Procedure Insertion/Change" flight plan editing.
Figure 6A:
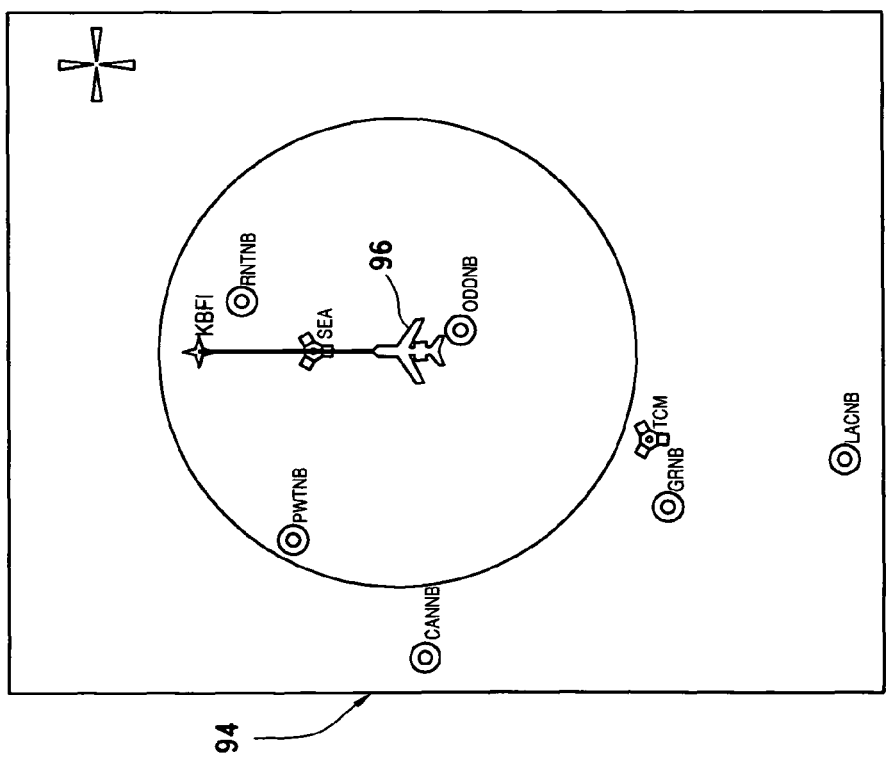
Figure 6D:
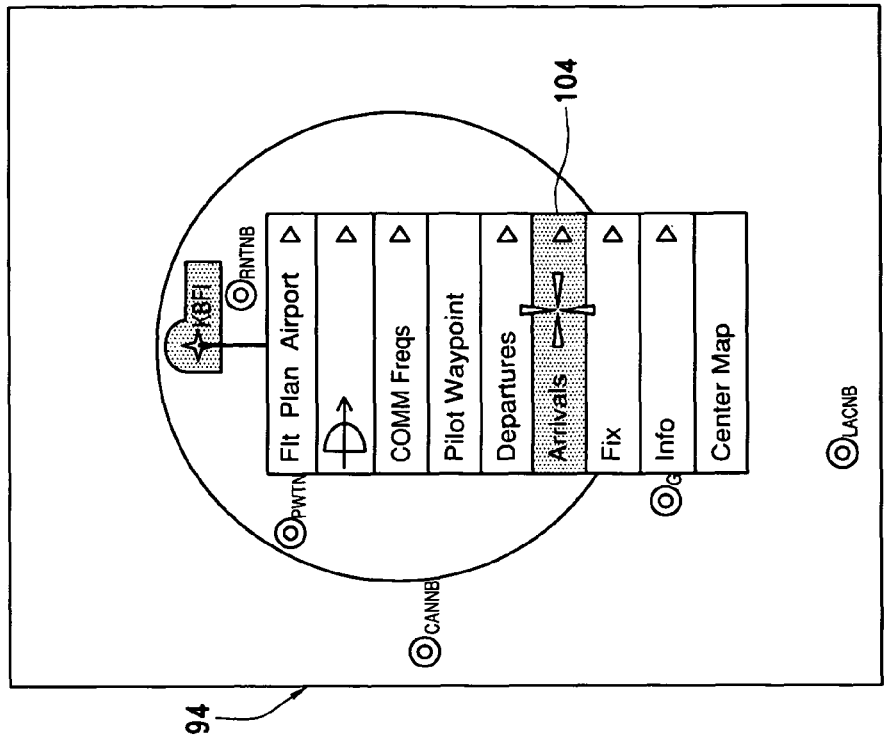
Figure 6C:
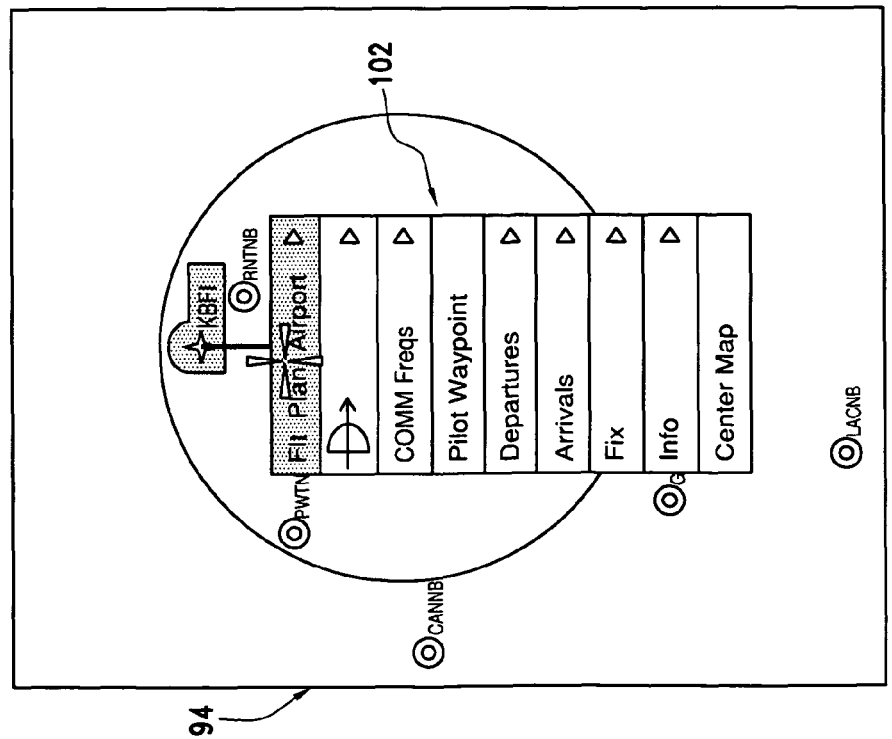
Figures 6E, 6F:
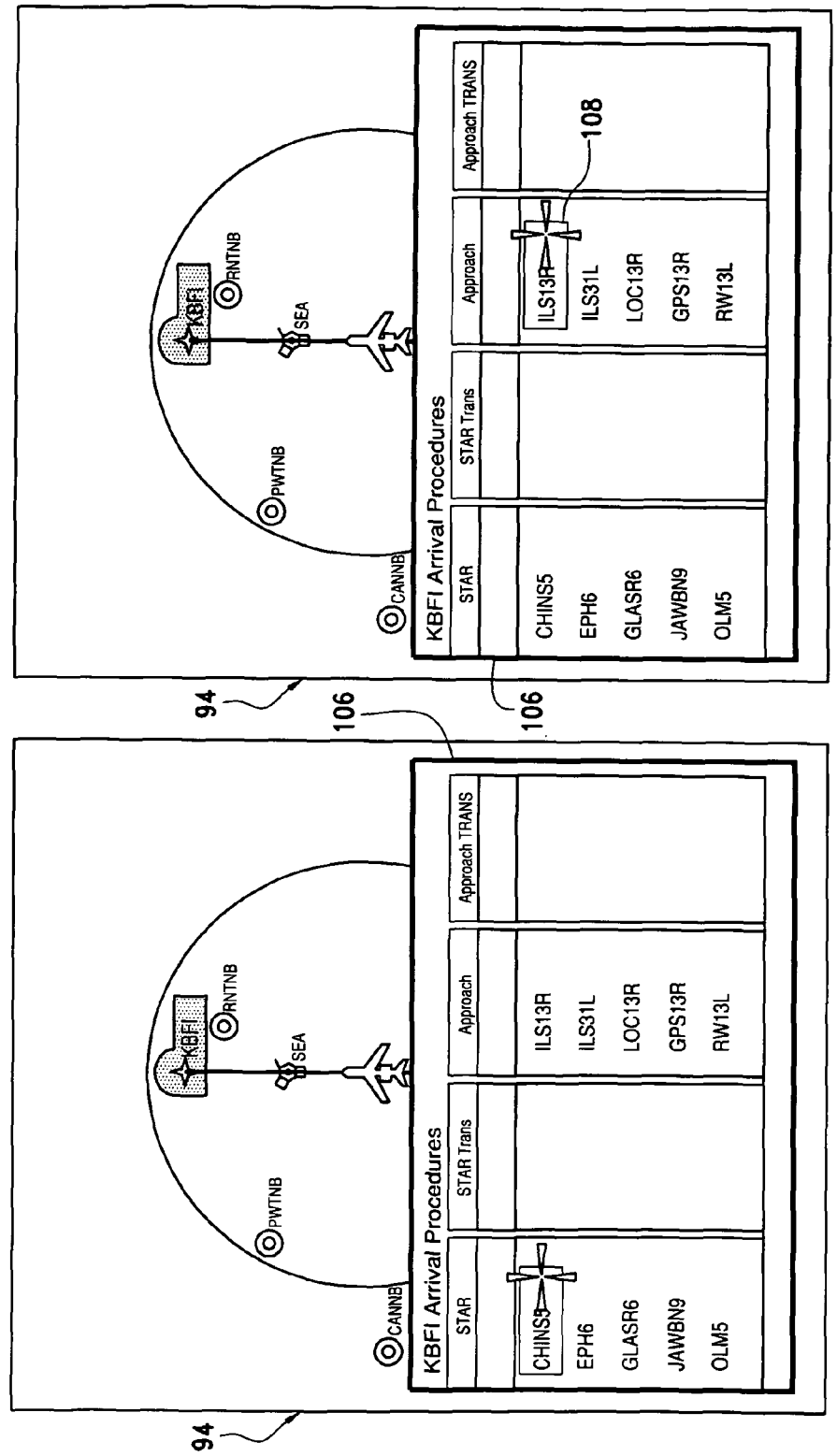
Figure 6G:
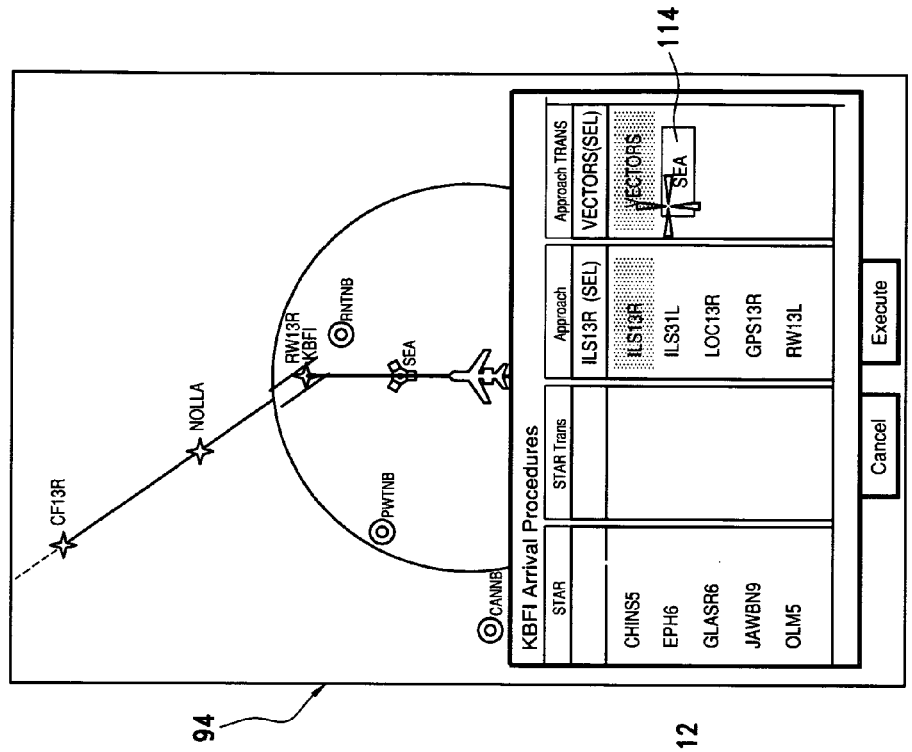
Figure 6H:
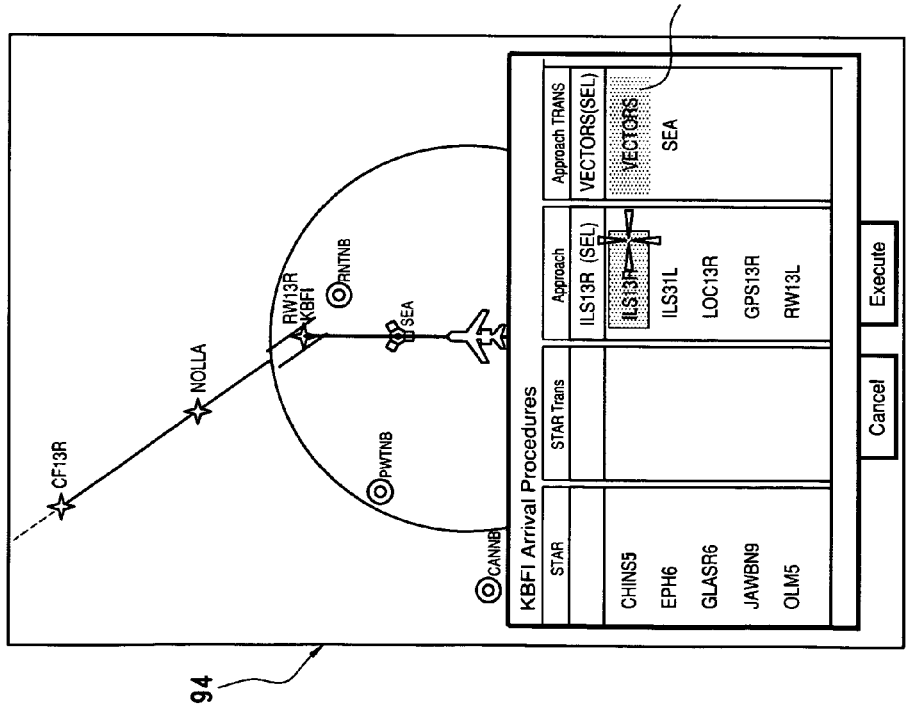
Figure 6J:
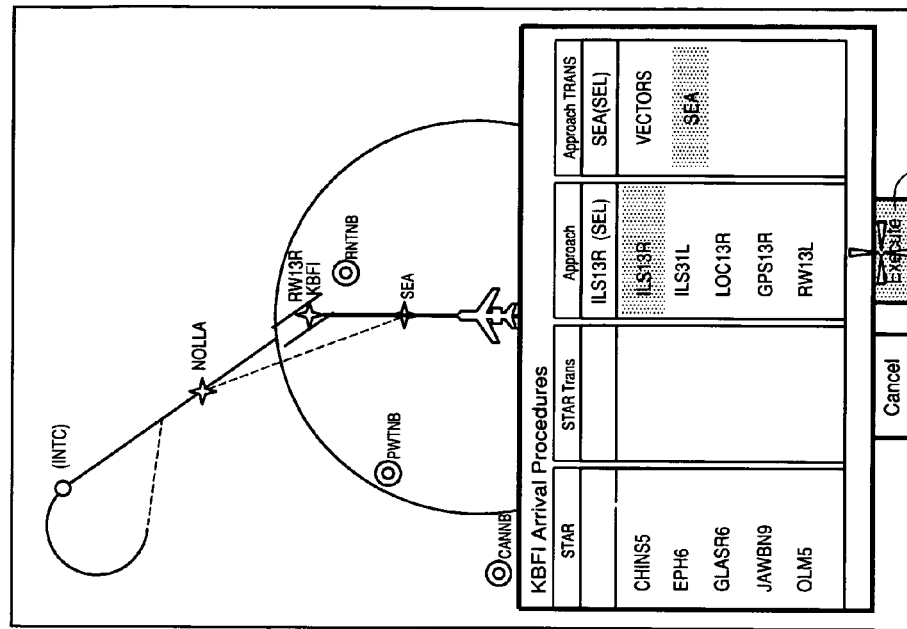
Figure 6I:
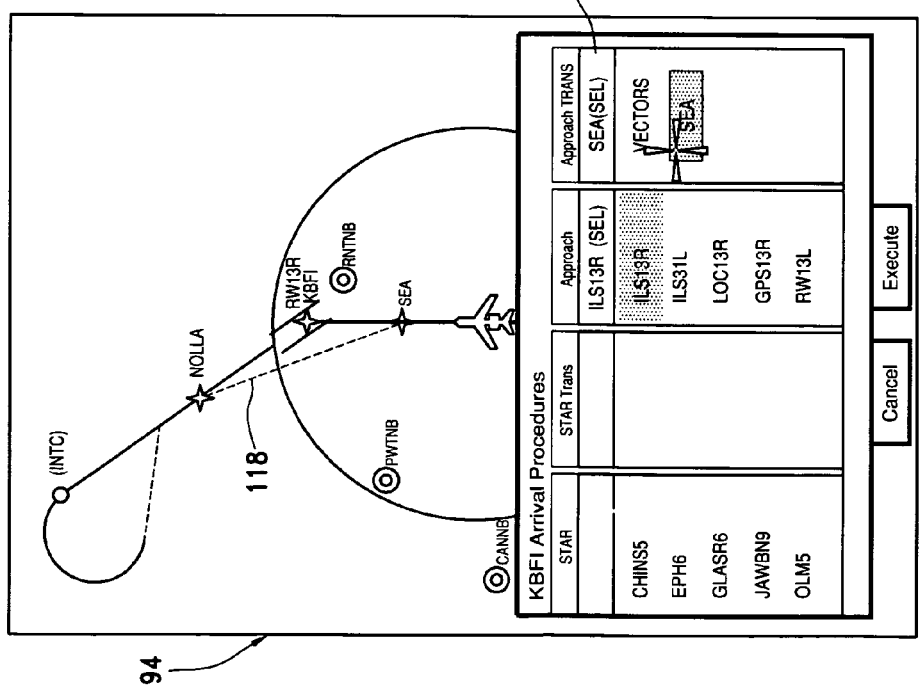
Figure 6L:
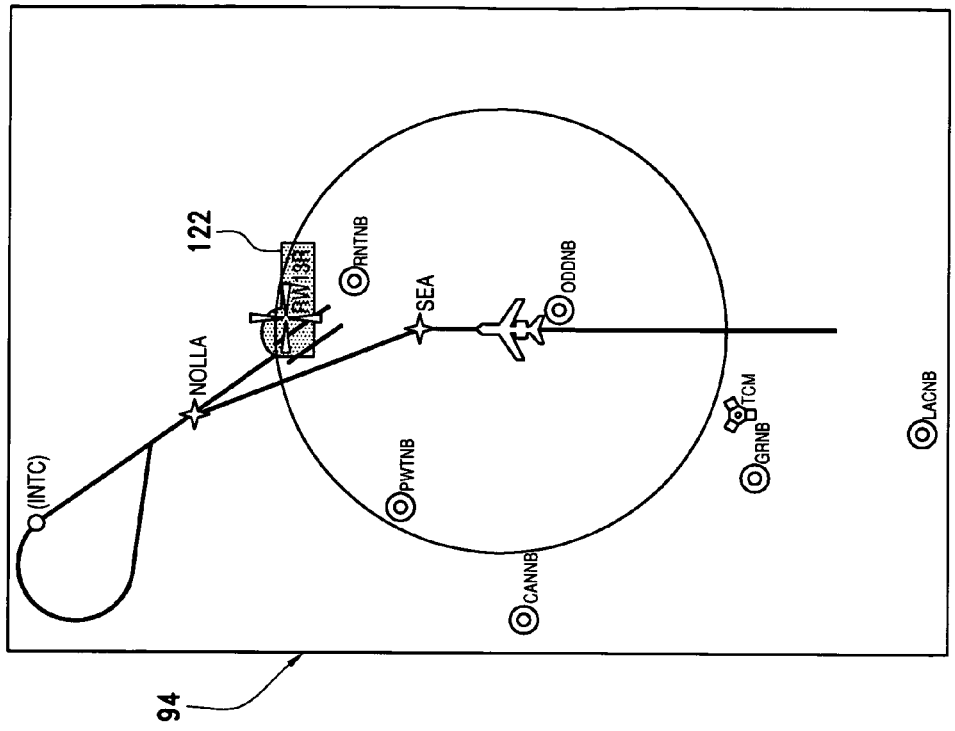
Figure 6K:
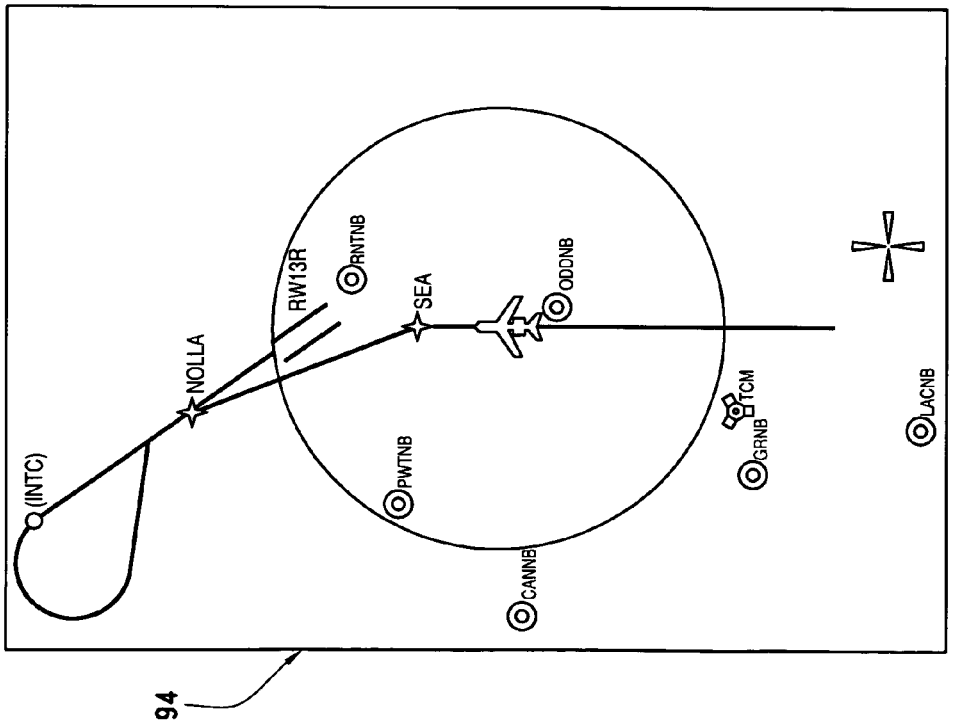
Figure 6N:
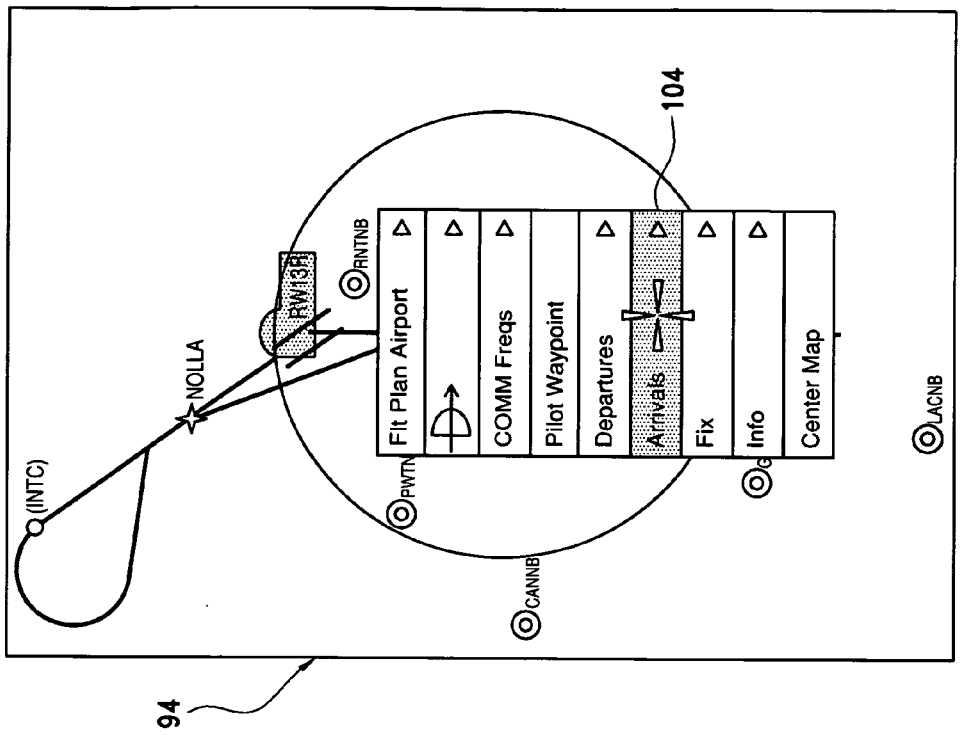
Figure 6M:
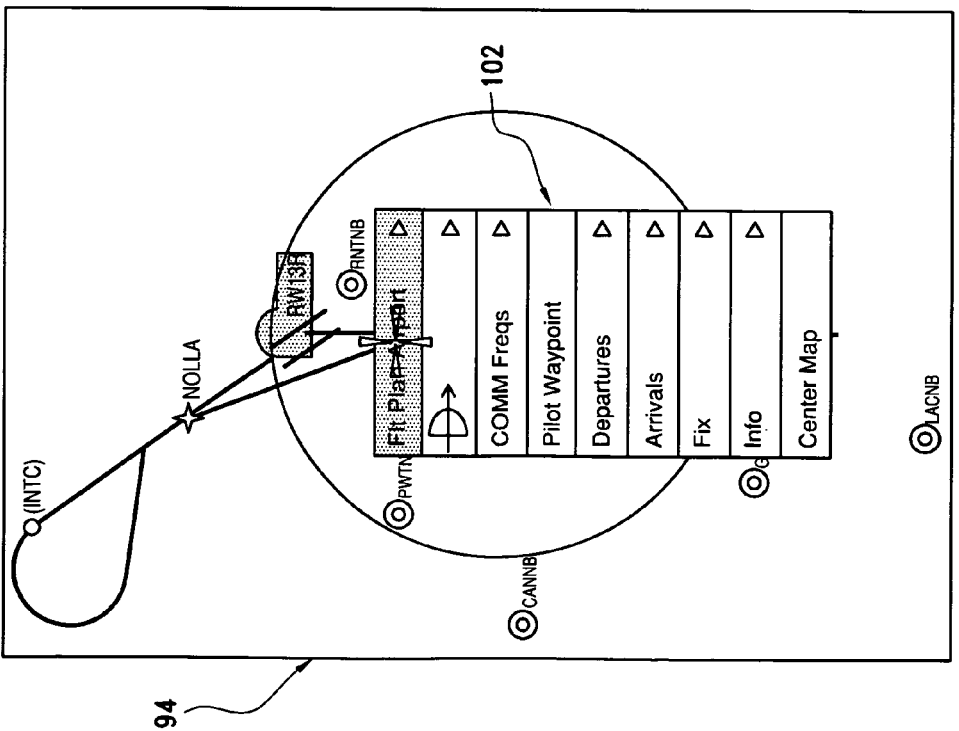
Figure 6P:
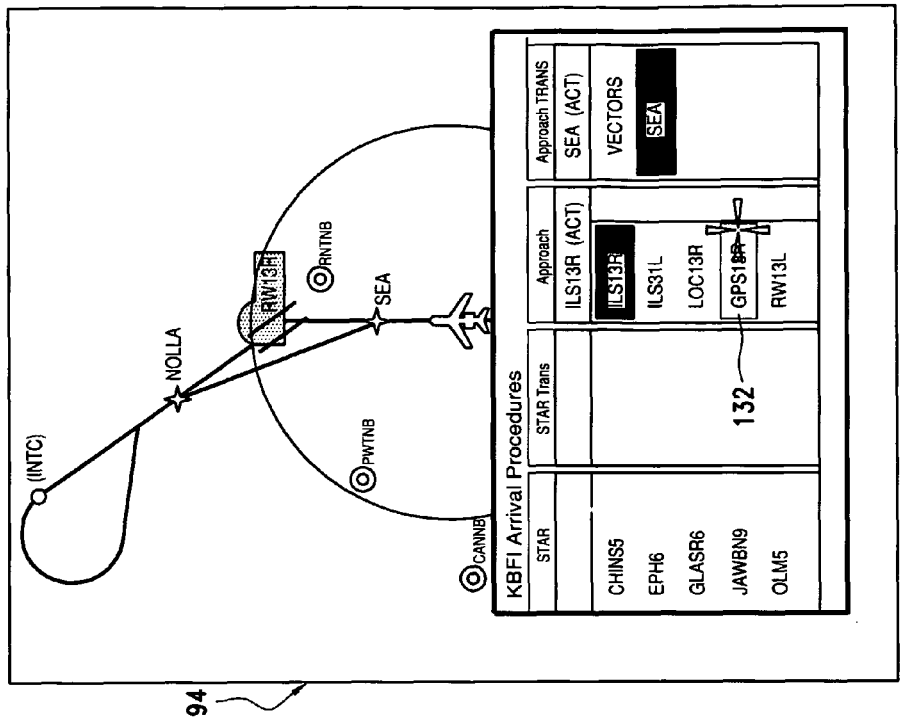
Figure 6O:
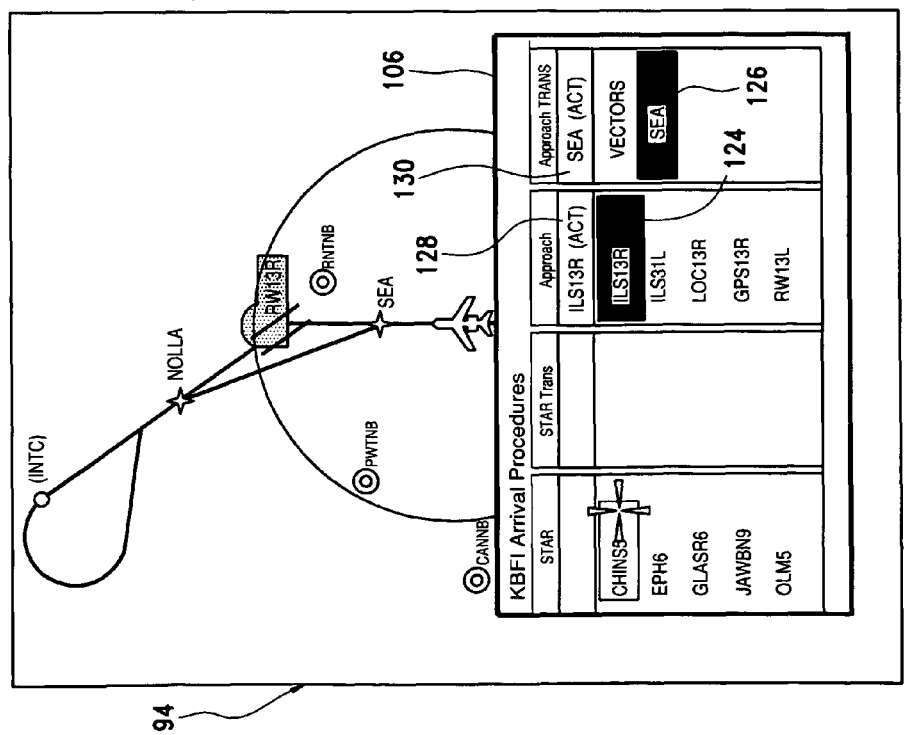
Figure 6S:
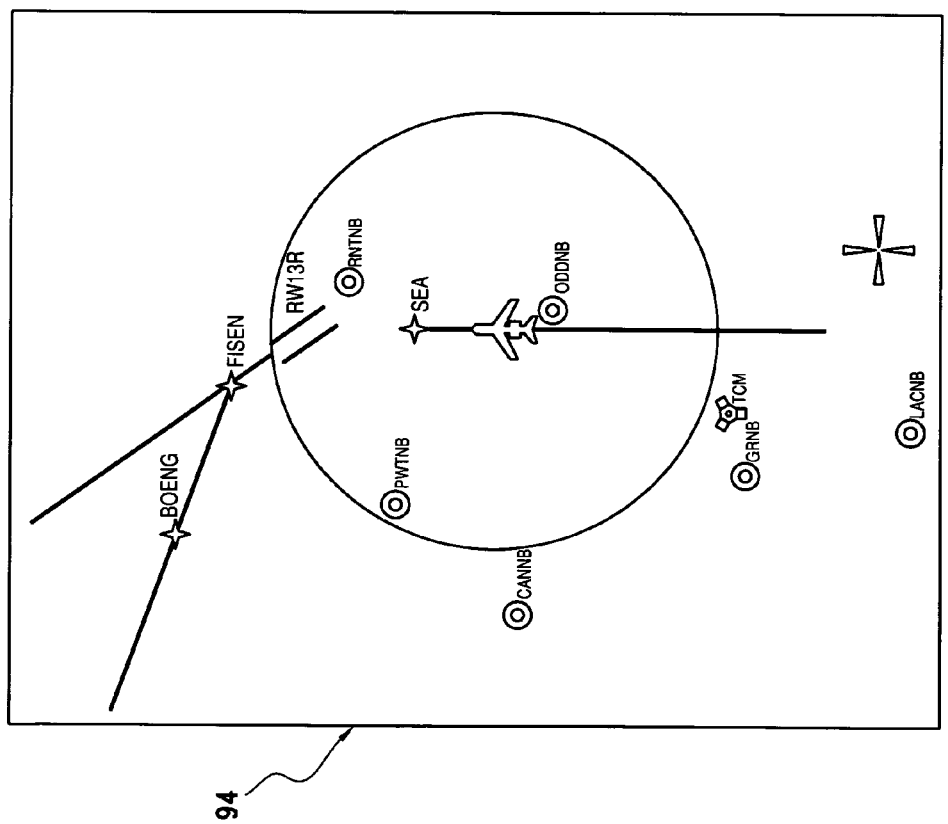

Referring now to FIGS. 6A-6S, illustration of the principles of the present invention for providing instrument procedure insertion/change graphical flight plan editing is shown. In FIG. 6A, an electronic display format 94 is illustrated showing an aircraft symbol 96 heading toward airport KBFI. In FIG. 6B the cursor 98 is positioned over the region of airport KBFI to highlight this region 100. The pushbutton on the CCD can be used to bring the airport task menu 102 into view (as shown in FIG. 6C). As shown in FIG. 6D the cursor is slewed over one of the instrument procedures tasks, which can be the "Departures" task or the "Arrivals" task 104, thus highlighting this task. In this example, the Arrivals task 104 is chosen. This task 104 is a virtual button on the MFD. The real pushbutton on the CCD 16 is used to select this task.

When the task is selected, the task menu 104 is replaced by an (instrument) arrival procedures dialogue box 106, as shown in FIG. 6E. This arrival procedures dialogue box 106 presents lists of instrument procedures, i.e. Standard Terminal Arrivals (STAR), STAR transitions, approach procedures and approach transitions for the selected airport, i.e. in this case KBFI. As can be seen in FIG. 6F, the cursor is positioned over the desired approach procedure designated as 108, i.e. in this case ILS13R. Selection of the desired approach procedure, via the CCD pushbutton, results in the approach being highlighted in the list and displayed as the selected approach procedure in the approach display readout. Additionally, as can be seen in FIG. 6G, a list of associated approach transitions for the selected approach are displayed. The vectors transition 112 is pre-selected by default. Furthermore, the corresponding approach legs are displayed on the electronic map format and a modified flight plan situation, as indicated by the Cancel and Execute virtual buttons. The cursor is then slewed over SEA 114 to choose it as the desired approach transition, as shown in FIG. 6H. Once the SEA approach transition 114 is selected using the CCD pushbutton, the SEA approach is highlighted in the list, displayed as the selected approach transition in the approach transition display readout 116 and the corresponding approach transition legs 118 are displayed on the electronic map format, as shown in FIG. 6I. The cursor is slewed over the virtual Execute button 120 to execute the graphical edits to the flight plan, as shown in FIG. 6J. If the command is executed, the flight plan modification is sent to the FMS for processing and the active flight plan which includes insertion of the ILS13R approach and SEA transition appears on the display, as shown in FIG. 6K.

In FIG. 6L the cursor is positioned over the region of airport runway RW13R to highlight this region 122. The pushbutton on the CCD can be used to bring the airport task menu 102 into view again (as shown in FIG. 6M). As shown in FIG. 6N the cursor is slewed over the "Arrivals" task 104 thus highlighting this task. When the task is selected, the task menu 102 is replaced by the arrival procedures dialogue box 106, as shown in FIG. 6O. This arrival procedures dialogue box 106 presents lists of Standard Terminal Arrivals (STAR), STAR transitions, approach procedures and approach transitions for the selected airport (i.e. in this case KBFI) with the active approach and approach transition selections uniquely highlighted 124 and 126, respectively and also displayed in the approach and approach transition display readouts 128 and 130, respectively. As can be seen in FIG. 6P, the cursor is positioned over a different approach procedure designated as 132, i.e. in this case GPS13R. Selection of this approach procedure, via the CCD pushbutton, results in the approach highlighted in the list 134, displayed as the selected approach procedure in the approach display readout 136, the list 138 of associated approach transitions for the selected approach are displayed, the vectors transition is pre-selected by default, the corresponding approach legs 140 are displayed on the electronic map format and a modified flight plan situation, as indicated by the Cancel and Execute virtual buttons are shown in FIG. 6Q. The cursor is slewed over the virtual Execute button to execute the graphical edits to the flight plan, as shown in FIG. 6R. If the command is executed, the flight plan modification is sent to the FMS for processing and the active flight plan which includes the approach procedure changed to the GPS13R approach with the vectors transition appears on the display, as shown in FIG. 6S.

Various other instrument procedure tasks can be accomplished in a similar manner such as insertion/change of STAR, STAR transitions, Standard Instrument Departures (SID), SID transitions and departure runways.

Figures 7A, 7B:
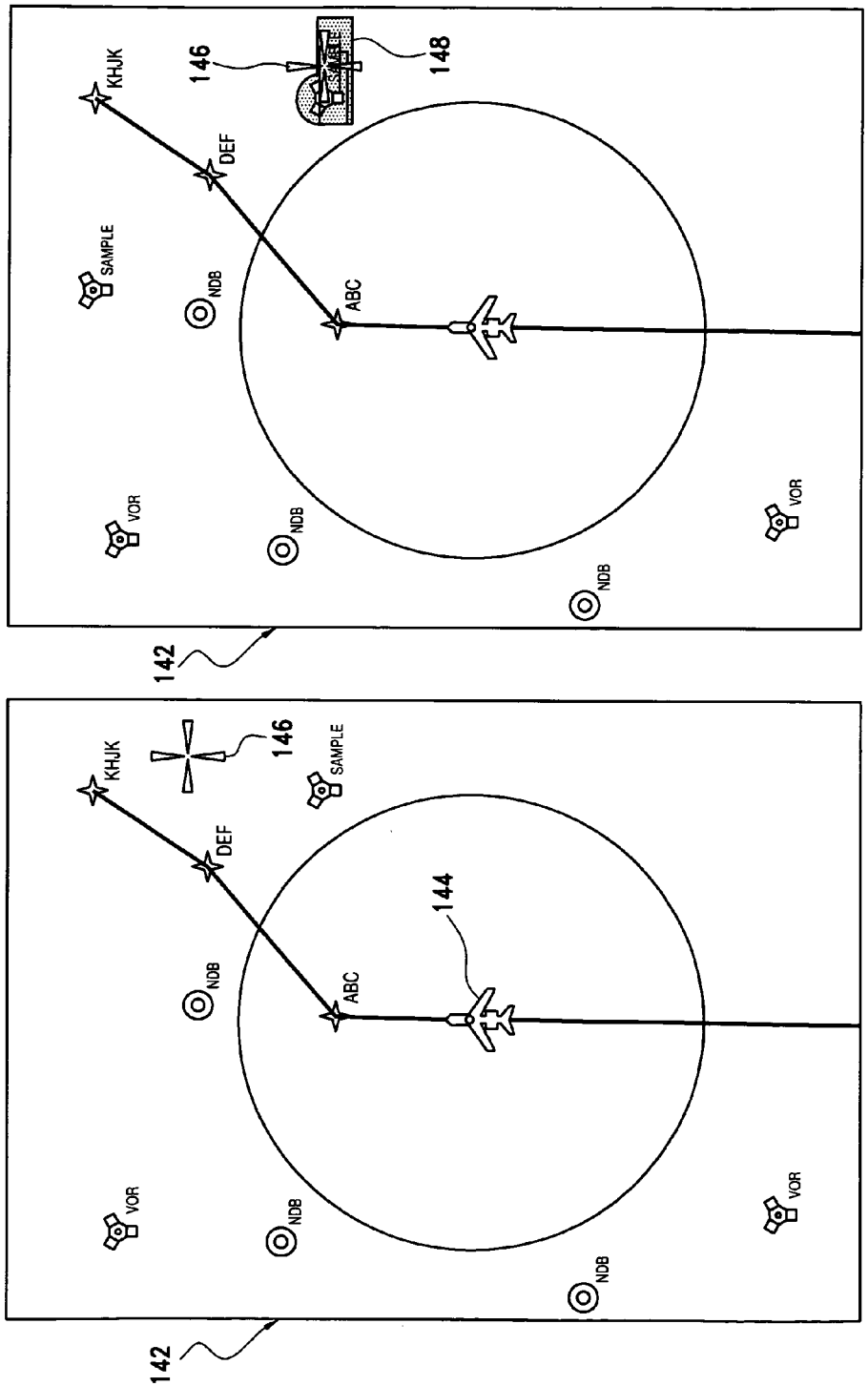
FIGS. 7A-7I are screen shots of a sixth embodiment of the present invention for defining a navigation reference fix.

Referring again now to FIG. 1, if an analog input control (AIC) device 30 is added, the system 10 can be used to graphically define a navigation reference fix. The AIC device 30 may be any number of devices such as a rotary knob, dual stack rotary knob, thumbwheel or touchpad. Furthermore, AIC device 30 and the CCD 16 may be a single unit, or alternatively substituted with an alphanumeric keypad 31 shown in phantom lines. Referring now to FIGS. 7A-7I, illustration of these inventive principles for defining a navigation reference fix is illustrated. In FIG. 7A, an electronic display format 142 is illustrated showing an aircraft symbol 144 heading toward waypoints ABC, DEF and KHJK. The display includes a cursor 146 that can be positioned via a CCD, typically a joystick.

Figure 7D:
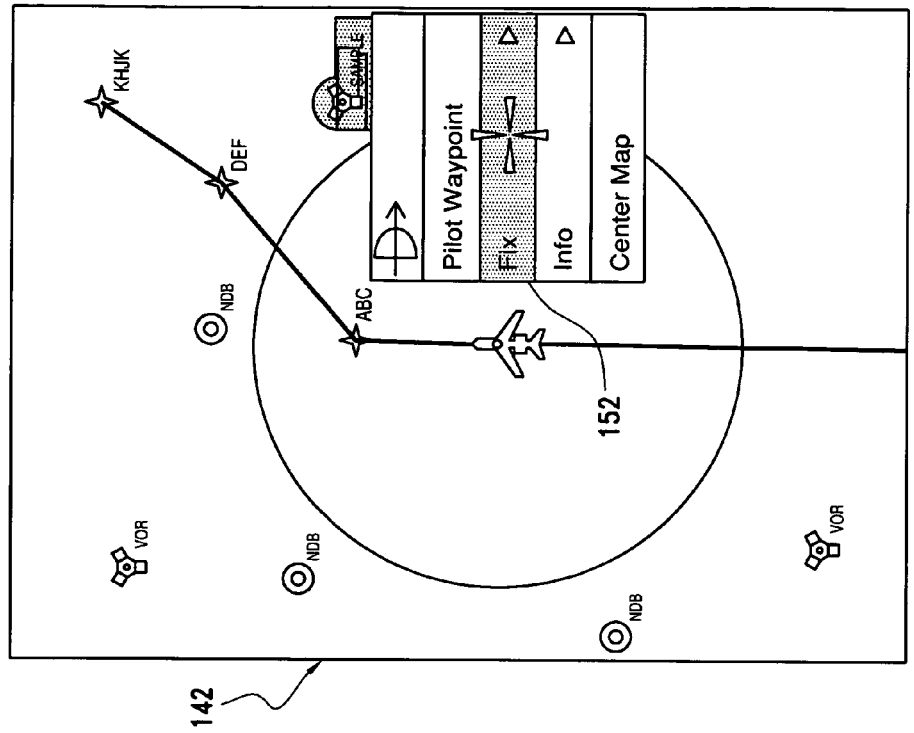
Figure 7C:
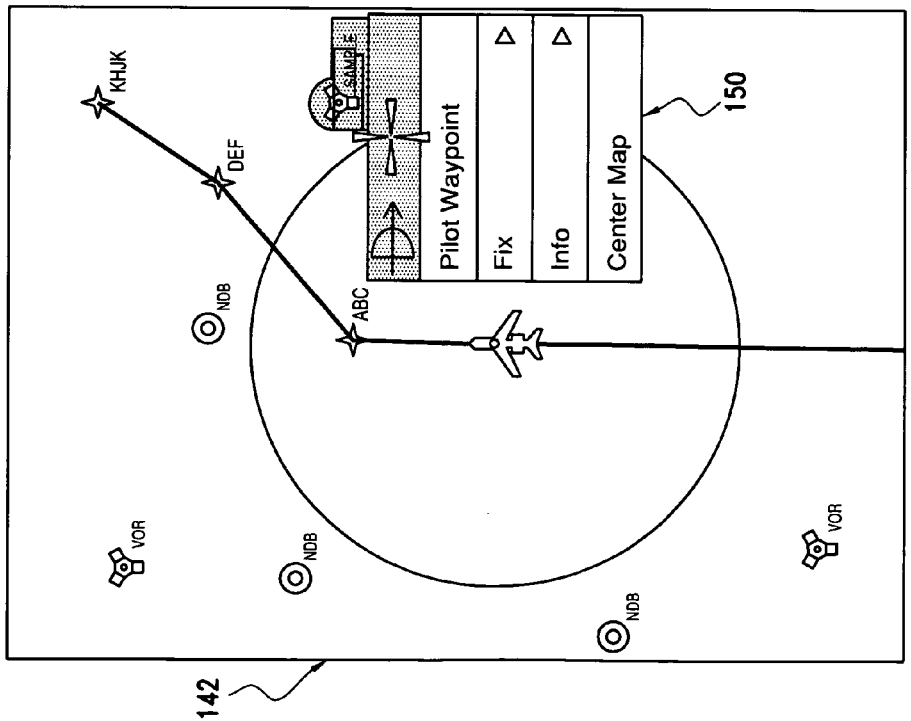
Figure 7E:
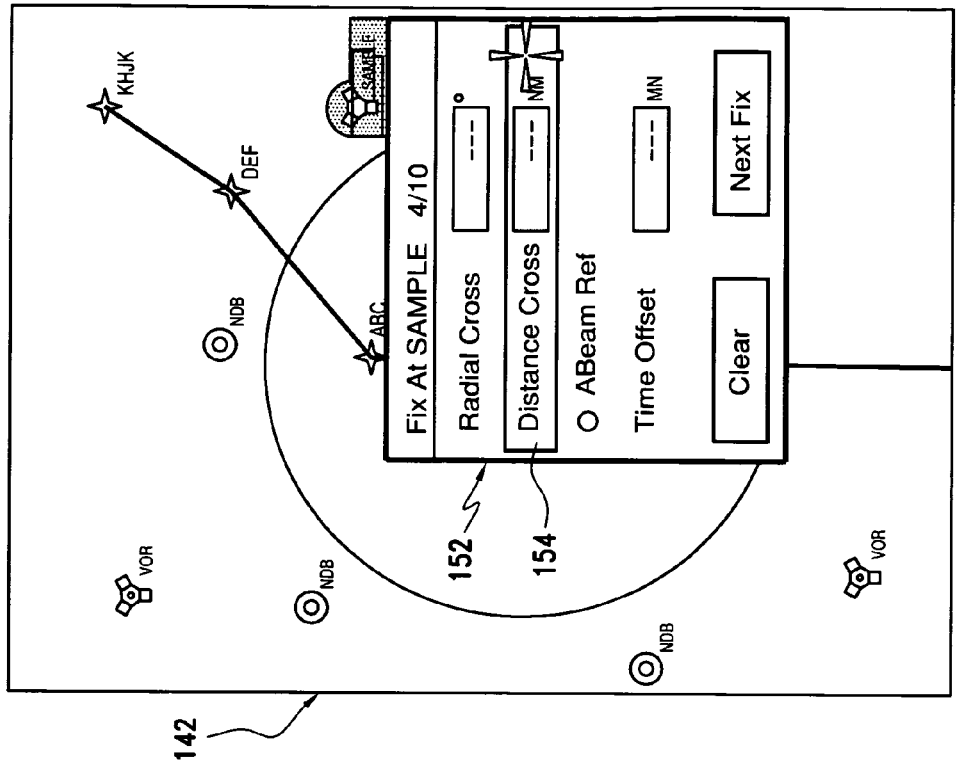
Figure 7F:
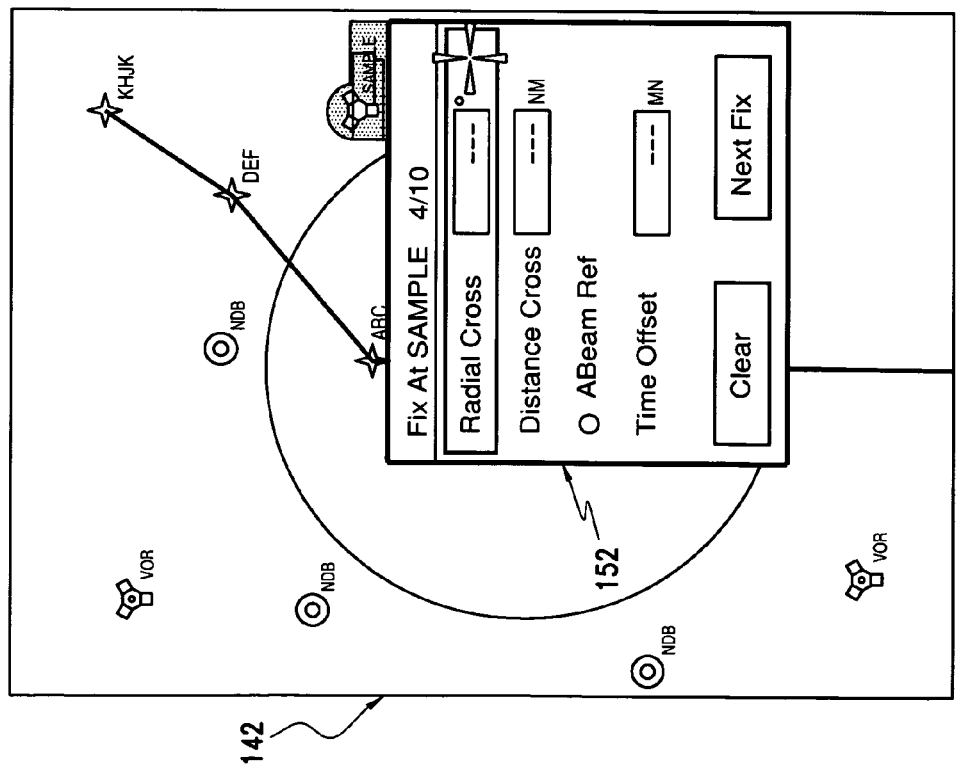
Figure 7H:
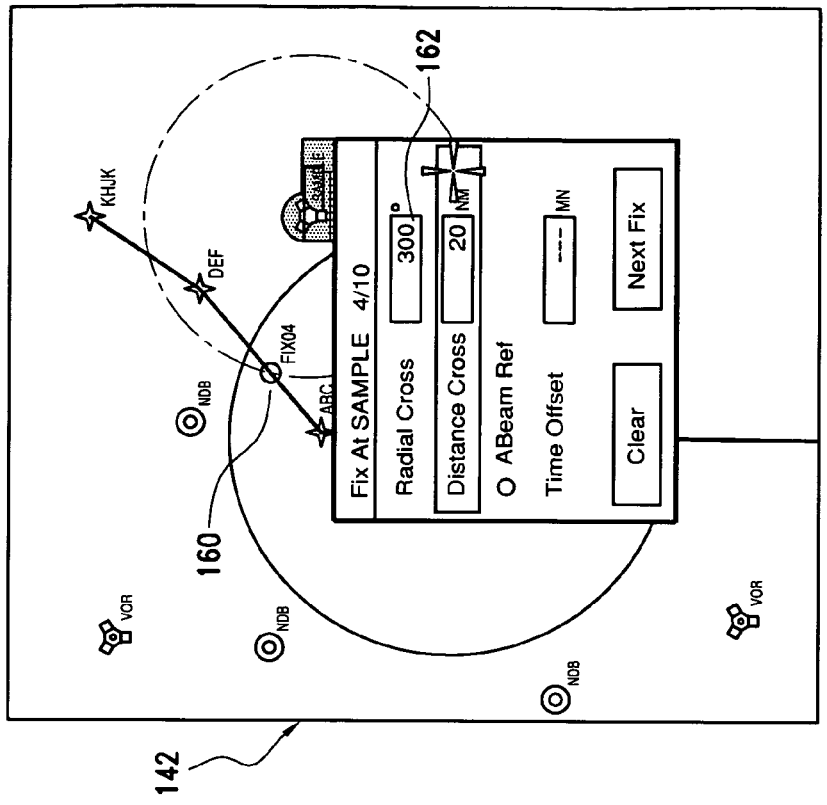
Figure 7G:
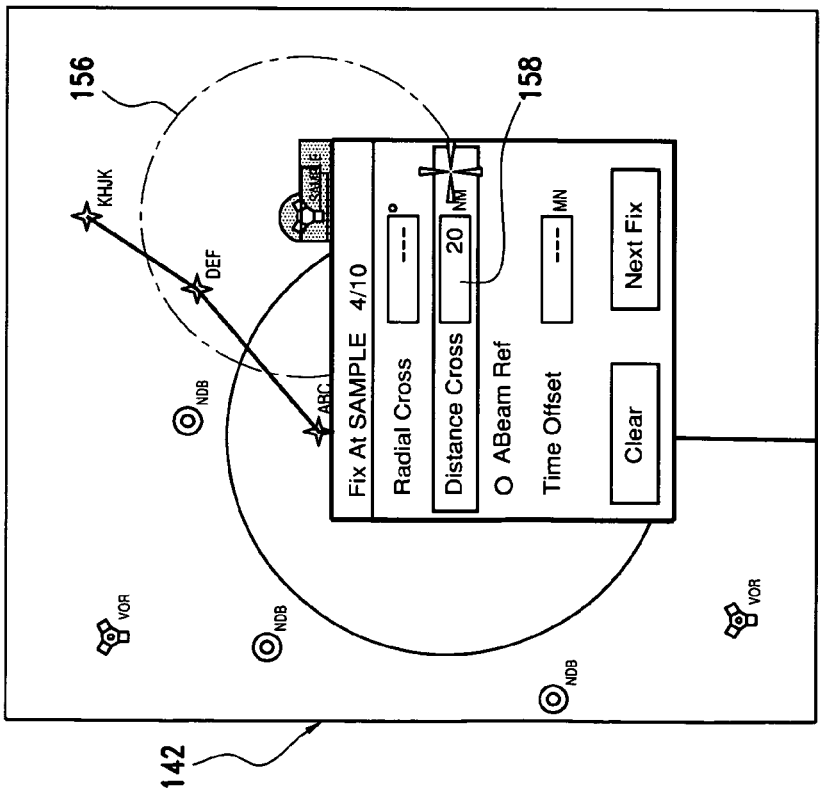
Figure 7I:
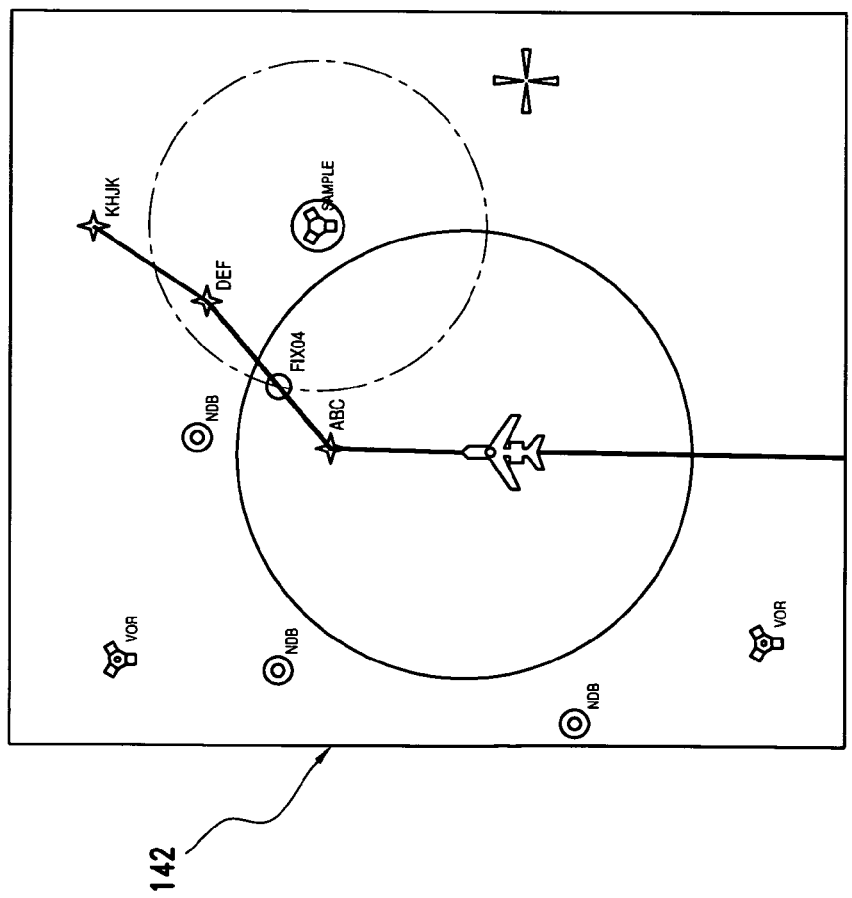

In FIG. 7B the cursor 146 is positioned in the region 148 of the navaid SAMPLE to highlight this region 148. The pushbutton on the CCD can be used to bring the navaid task menu 150 into view (as shown in FIG. 7C). As shown in FIG. 7D the cursor is slewed over the "Fix" virtual task button 152 thus highlighting this virtual task button. This task 152 is a virtual button on the MFD. The real pushbutton on the CCD 16 is used to select this task. When the task is selected, the task menu 150 is replaced by a Fix dialogue box 152, as shown in FIG. 7E. This fix dialogue box 152 presents a variety of methods for defining a navigation reference fix including a radial crossing, distance crossing, abeam reference and time offset. The cursor is then slewed over the distance crossing region 154 to choose that as the desired means to graphically define the navigation reference fix, as shown in FIG. 7F. As can be seen in FIG. 7G, once the distance crossing numerical value displayed in the readout window is being entered and/or adjusted using the analog input device 30, an uneven dashed circle 156 is displayed around the reference fix SAMPLE. The size of this uneven dashed circle 156 is scaled according to the value being adjusted in the crossing distance readout window 158, in this case 20 NM. After entry/adjustment of the distance crossing value is finished, the pushbutton on the CCD is used to complete the operation which then allows the MFD to send the navigation reference fix definition parameters to the FMS for processing. FIG. 7H illustrates the results of the FMS processing which include the graphical display of the location 160 where the defined distance from the reference fix intersects the flight plan route, in this case FIX04 and the computed radial of 300 degrees 162. FIG. 7I illustrates the graphical depiction of the 20 NM distance crossing reference fix at SAMPLE intact after the cursor is moved off the fix dialog box 152 and the dialog box is closed.

Various other reference navigation fix definition tasks can be accomplished in a similar manner such as reference fix radial, line of latitude and line of longitude crossing definitions.

Other embodiments and configurations may be devised without departing from the spirit of the invention and the scope of the appended claims.

The invention claimed is:

1. A system for performing an expedited graphical flight plan edit for an aircraft, comprising:
   a) a graphical flight management system (FMS) including graphical flight planning capabilities for an aircraft;
   b) a multi-function display (MFD) directly connected to said FMS; and,
   c) a cursor control device (CCD) operatively connected to said MFD;
   wherein said CCD is configured to solely interact directly with said MFD as the user interface to the FMS for performing shortcut graphical flight plan edits, obviating the use of a control display unit (CDU), wherein said CCD is used to provide said shortcut graphical flight plan edits selected from the group consisting of: Expedited Direct To, Expedited Vertical Direct To, Vectors to Final, and Sequence Vectors, wherein Expedited Direct To is a shortcut task which allows for an expedited direct to the current active waypoint which bypasses a modified flight plan state and corresponding execute/cancel operations, Expedited Vertical Direct-To is a shortcut which allows for a vertical direct to the active altitude constraint in the flight plan, Vectors to Final is a shortcut to select the vectors transition for the existing approach procedure in flight plan, and Sequence Vectors is a shortcut which sequences the vectors transition.

2. The system of claim 1, wherein said CCD presents a task menu comprising a plurality of virtual buttons on said MFD.

3. The system of claim 2, wherein said virtual buttons each comprises a lightning bolt icon.

4. The system of claim 1, wherein said CCD presents a task menu comprising a plurality of virtual buttons on said MFD, two of said virtual buttons being for said Expedited Direct To and said Expedited Vertical To flight planning operations, said virtual buttons for said Expedited Direct To and said Expedited Vertical To operations comprising a button window having a display readout.

5. A system for performing a waypoint vertical direct to graphical flight plan edit for an aircraft, comprising:
   a) a graphical flight management system (FMS) including waypoint vertical direct to graphical flight planning capabilities for an aircraft;
   b) a multi-function display (MFD) directly connected to said FMS;
   c) a cursor control device (CCD) operatively connected to said MFD; and,
   d) an analog input control (AIC) device for controlling a numerical value, said AIC device being operatively connected to said display;
   wherein said CCD and said AIC device are so arranged and configured to solely interact directly with said MFD as the user interface to the FMS for performing a waypoint vertical direct to graphical flight plan edit, obviating the use of a control display unit (CDU).

6. The system of claim 5, wherein said CCD presents a task menu including a virtual task button on said MFD.

7. The system of claim 6, wherein said virtual task button comprises a button window having a display readout which is modifiable by the user.

8. The system of claim 5, wherein completion of an entry using said AIC device completes the data entry and also selects the waypoint vertical direct to operation.

9. The system of claim 5, wherein said CCD and said AIC device are located on a single device.

10. A system for performing a parallel offset graphical flight plan edit for an aircraft, comprising:
    a) a graphical flight management system (FMS) including parallel offset graphical flight planning capabilities for an aircraft;
    b) a multi-function display (MFD) directly connected to said FMS;
    c) a cursor control device (CCD) operatively connected to said MFD; and,
    d) an analog input control (AIC) device for controlling a numerical value, said AIC device being operatively connected to said MFD;
    wherein said CCD and said AIC device are so arranged and configured to solely interact directly with said MFD as the user interface to the FMS for performing a parallel offset graphical flight plan edit, obviating the use of a control display unit (CDU).

11. The system of claim 10, wherein said CCD presents a task menu comprising a virtual button on said MFD.

12. The system of claim 10, wherein said CCD presents a task menu comprising a virtual button on said MFD which is replaced by a course line, a display dynamic readout, and a ghost aircraft,
    wherein manipulation of said AIC device provides adjustment of a value of said display dynamic readout and commensurate dynamic positioning of said display dynamic readout, said course line and said ghost aircraft,
    and wherein completion of an entry using said CCD completes the parallel offset adjustment.

13. A system for performing an airway insertion graphical flight plan edit for an aircraft, comprising:
    a) a graphical flight management system (FMS) including airway insertion graphical flight planning capabilities for an aircraft;
    b) a multi-function display (MFD) directly connected to said FMS;
    c) a cursor control device (CCD) operatively connected to said MFD; and,
    d) an analog input control (AIC) device for graphically highlighting a desired selection, said AIC device being operatively connected to said MFD;
    wherein said CCD and said AIC device are so arranged and configured to solely interact directly with said MFD as the user interface to the FMS for performing an airway insertion graphical flight plan edit, obviating the use of a control display unit (CDU).

14. The system of claim 13, wherein said CCD presents a waypoint task menu comprising a virtual button on said MFD which, upon selection of an airway task the waypoint task menu is replaced by an airways dialogue box, comprising a circle denoted by a selected waypoint, said circle having a plurality of optional airways extending therefrom,
    wherein manipulation of said AIC device provides graphical highlighting of a desired airway, selection of said desired airway via said CCD, providing closure of said airways dialogue box and display of an airway exit identifier list, wherein selection of an identifier region from said airway exit identifier list results in appearance of a proposed airway flight plan edit on the display, and wherein completion of an entry using said CCD completes the flight plan modification.

15. A system for performing instrument procedure insertion/change flight plan editing for an aircraft, comprising:
   a) a graphical flight management system (FMS) including instrument procedure insertion/change graphical flight planning capabilities for an aircraft;
   b) a multi-function display (MFD) directly connected to said FMS; and,
   c) a cursor control device (CCD) operatively connected to said MFD;
   wherein said CCD is configured to interact directly with said MFD as the user interface to the FMS for performing instrument procedure insertion/change graphical flight plan edits, obviating the use of a control display unit (CDU).

16. The system of claim 15, wherein said CCD presents an airport task menu comprising a virtual button on said MFD which, upon selection of an instrument procedures task the airport task menu is replaced by an instrument procedures dialogue box having a plurality of lists of available instrument procedures for a selected airport,
   wherein manipulation of said CCD provides graphical highlighting of a desired instrument procedure from said plurality of lists,
   wherein selection of said desired instrument procedure via said CCD results in the flight plan to be modified to include said instrument procedure, the selected identifier highlighted in the list and displayed in a readout window above the list, and,
   wherein said plurality of lists of available instrument procedures remain in view after selections are made and the appearance of the selected instrument procedure is shown on the display.

17. The system of claim 15, wherein said plurality of lists of instrument procedures remain in view after selections are made with the active selection and new selection highlighted differently in the list.

18. A system for defining a navigation reference fix for an aircraft, comprising:
   a) a graphical flight management system (FMS) including graphical flight planning capabilities for an aircraft;
   b) a multi-function display (MFD) directly connected to said FMS;
   c) a cursor control device (CCD) operatively connected to said display; and,
   d) an analog input control (AIC) device for controlling a numerical value, said control device being operatively connected to said display;
   wherein said CCD and said AIC device are so arranged and configured to solely interact directly with said MFD as the user interface to the FMS to provide a graphical means for defining a desired navigation fix, obviating the use of a control display unit (CDU).

19. The system of claim 18, wherein said CCD presents a task menu comprising a virtual button on said MFD which, upon selection of a fix task the task menu is replaced by a fix dialogue box, comprising a means to enter/adjust navigation reference fix input parameter values,
   wherein manipulation of said CCD provides graphical highlighting of a desired navigation reference fix input parameter,
   wherein manipulation of said AIC device provides adjustment of value of said navigation reference fix input parameter and commensurate dynamic positioning and scaling of navigation reference fix symbology on the display,
   and wherein completion of an entry using said CCD completes the navigation reference fix input parameter definition.

\* \* \* \* \*